United States Patent [19]

Akatsuka et al.

[11] Patent Number: 5,523,867

[45] Date of Patent: Jun. 4, 1996

[54] LIQUID CRYSTAL DISPLAY DEVICE HAVING LIGHT SHIELDING FILM AND BIREFRINGENT FILMS WITH $N_X=N_Z>N_Y$

[75] Inventors: Minoru Akatsuka; Yuji Sohda, both of Yokohama; Kazutoshi Sawada, Nishinomiya, all of Japan

[73] Assignee: Asahi Glass Company Ltd., Tokyo, Japan

[21] Appl. No.: 358,942

[22] Filed: Dec. 19, 1994

Related U.S. Application Data

[62] Division of Ser. No. 274,388, Jul. 13, 1994, Pat. No. 5,406,396, which is a division of Ser. No. 987,455, Dec. 7, 1992, Pat. No. 5,369,513, which is a division of Ser. No. 613,558, Nov. 16, 1990, Pat. No. 5,194,975.

[30] Foreign Application Priority Data

| Mar. 28, 1989 | [JP] | Japan | 1-73952 |
| Apr. 6, 1989 | [JP] | Japan | 1-85741 |
| Apr. 27, 1989 | [JP] | Japan | 1-105865 |
| May 1, 1989 | [JP] | Japan | 1-109188 |
| May 23, 1989 | [JP] | Japan | 1-127870 |
| Jul. 12, 1989 | [JP] | Japan | 1-177964 |

[51] Int. Cl.⁶ ................................. G02F 1/1335
[52] U.S. Cl. ............... 359/73; 359/67; 359/102
[58] Field of Search ................. 359/63, 67, 68, 359/73, 93, 102, 494, 500; 428/1

[56] References Cited

U.S. PATENT DOCUMENTS

| 5,016,988 | 5/1991 | Iimura | 359/93 |
| 5,056,896 | 10/1991 | Iimura et al. | 359/94 |
| 5,142,393 | 8/1992 | Okumura et al. | 359/73 |
| 5,189,538 | 2/1993 | Arakawa | 359/73 |

OTHER PUBLICATIONS

Ohgawara et al "A Color STN Display with Two Retardation Compensating Films" SID 89 Digest—May 1989—pp. 390–393.

*Primary Examiner*—William L. Sikes
*Assistant Examiner*—Tai V. Duong
*Attorney, Agent, or Firm*—Oblon, Spivak, McClelland, Maier & Neustadt

[57] ABSTRACT

The liquid crystal display device of the present invention comprises a liquid crystal layer of a nematic liquid crystal having positive dielectric anisotropy and including a chiral material, the liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and at least one birefringent plate provided between the liquid crystal layer and the polarizing plate at at least one side of the liquid crystal layer, wherein the product $\Delta n_1 \cdot d$, of the anisotropy of refractive index $\Delta n$, of liquid crystal molecules in the liquid crystal layer and the thickness d, of the liquid crystal layer is in a range of 0.4–1.5 μm, and three main refractive indices $n_x$, $n_y$ and $n_z$ of the birefringent plate are in a relation of $n_x \geq n_z > n_y$ where $n_x$ and $n_y$ respectively represent the refractive indices in the direction of film plane of the birefringent plate (provided $n_x > n_y$) and $n_z$ represents the refractive index in the direction of film thickness of the birefringent plate.

2 Claims, 13 Drawing Sheets

LIQUID CRYSTAL DISPLAY DEVICE HAVING LIGHT SHIELDING FILM AND BIREFRINGENT FILMS WITH $N_X=N_Z>N_Y$

This is a division of application Ser. No. 08/274,388 filed on Jul. 13, 1994, U.S. Pat. No. 5,406,396, which is a division of application Ser. No. 07/987,455 filed on Dec. 7, 1992, U.S. Pat. No. 5,369,513, which is a division of application Ser. No. 07/613,558, filed on Nov. 16, 1990, U.S. Pat. No. 5,194,975.

TECHNICAL FIELD

The present invention relates to a liquid crystal display device suitable for a high density display.

BACKGROUND TECHNIQUE

A super twist device has been known to obtain a high density dot matrix display by increasing a twist angle of liquid crystal molecules between electrodes to thereby cause a steep change in transmittance vs. voltage curve (T. J. Schenffer and J. Nehring, *Appl., Phys., Lett.* 45 (10) 1021–1023 (1984)).

In the above-mentioned technique, however, the value of the product $\Delta n \cdot d$ of the birefringence $\Delta n$ of liquid crystal molecules in a liquid crystal display device and the thickness d of the liquid crystal layer was substantially in a range of 0.8–1.2 µm (Japanese Unexamined Patent Publication No. 10720/1985), and a good contrast ratio could not be obtained unless a specified combination of hue such as yellowish green and dark blue, bluish purple and pale yellow and so on was used as a display color.

In the conventional liquid crystal display device, it was impossible to obtain a multicolor display or a fullcolor display by combining it with a multicolor filter because the conventional technique could not provide a monochrome (black and white) display.

On the other hand, there was proposed a system which utilized the similar system and was obtainable a display close to a monochrome display by determining the product $\Delta n \cdot d$ of the birefringence of the liquid crystal and the thickness to be small as about 0.6 µm (M. Schadt et al, *Appl. Phys. Lett.* 50 (5), 1987, p. 236).

However, the proposed system had such disadvantages that it was dark; the greatest contrast ratio is not so large and the display had a bluish color so that clearness in display is poor.

There was proposed a system to realize a liquid crystal display device capable of displaying a monochrome display and having a high contrast ratio that two liquid crystal cells which have opposite helical sense each other are placed on one another wherein a voltage is applied to either cell and the other cell is merely used as an optical compensation plate (*Report of Television Association* 11 (27), p. 79, (1987) by Okumura et al., J. J. A. P., 26 (11), L1784 (1987) by Kato et al). However, the proposed system has such drawbacks that the matching of the product $\Delta n \cdot d$ between the two overlaid cells was very severe, hence, it was difficult to improve yield and the characteristic feature to produce a thin and light liquid crystal cell was sacrificed because it was necessary to overlay two liquid crystal cells.

Further, there was a proposal that a film stacked type liquid crystal display device for a monochrome display wherein one of the two overlaid cells was replaced by a uniaxial birefringent film (Japanese Unexamined Patent Publication No. 271415/1988).

As the above-mentioned uniaxial birefringent film, a uniaxial birefringent film having the optical axis in its film plane is generally used. Namely, the generally used uniaxial birefringent film has a nature of $n_x>n_y=n_z$ wherein $n_x$, $n_y$ and $n_z$ represent three main refractive indices where $n_x$ and $n_y$ represent the refractive indices in the direction of film plane (provided $n_x>n_y$) and $n_z$ represents the refractive index in the direction of film thickness.

In the film stacked type liquid crystal display device of the above-mentioned system which used the uniaxial birefringent film having the optical axis in its film plane in order to effect the compensation of the liquid crystal cell, it had disadvantages that a display was colored when it was viewed from an oblique direction, or black and white tones are inversed. Accordingly, it was difficult to produce, with high yield, a liquid crystal display device which has high brightness, good black and white characteristic and a wide viewing angle.

The liquid crystal display device having a bright, black and white display and having a wide viewing angle can realize a monocolor, a multicolor or fullcolor display as that realized by a conventional 90°-twisted twist nematic (TN) device by forming a color filter at the inside or the outside of the cell in addition that it can be easily viewed without causing coloring. Accordingly, great expansion of a market can be expected due to the feature of thin, light and low power consumption. Therefore, liquid crystal display devices capable of producing with high yield monochrome display elements having a bright display, a wide viewing angle and a high contrast have been expected.

DISCLOSURE OF THE INVENTION

It is an object of the present invention to eliminate the above-mentioned problems and to provide a liquid crystal display device comprising a liquid crystal layer of a nematic liquid crystal having positive dielectric anisotropy and including a chiral material, the liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and at least one birefringent plate provided between the liquid crystal layer and the polarizing plate at at least one side of the liquid crystal layer, characterized in that the product $\Delta n_1 \cdot d_1$ of the anisotropy of refractive index $\Delta n_1$ of liquid crystal molecules in the liquid crystal layer and the thickness $d_1$ of the liquid crystal layer is in a range of 0.4–1.5 µm, and three main refractive indices $n_x$, $n_y$ and $n_z$ of the birefringent plate are in a relation of $n_x \geq n_z > n_y$, where $n_x$ and $n_y$ respectively represent the refractive indices in the direction of film plane of the birefringent plate (provided $n_x>n_y$) and $n_z$ represents the refractive index in the direction of film thickness of the birefringent plate.

Specifically, the present invention is to provide a liquid crystal display device comprising a liquid crystal layer of a nematic liquid crystal having positive dielectric anisotropy and including a chiral material, the liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and at least one birefringent plate provided between the liquid crystal layer and the polarizing plate at at least one side of the liquid crystal layer, characterized in that the product $\Delta n_1 \cdot d_1$ of the anisotropy of refractive index $\Delta n_1$ of liquid crystal molecules in the liquid crystal layer and the thickness $d_1$ of the liquid crystal layer is in a range of 0.4–1.5 µm, and the birefringent plate is a biaxial birefringent plate having three different refractive indices in the three directions which mutually intersect at a right angle, wherein three main refractive indices $n_x$, $n_y$ and $n_z$ of the birefringent plate are in a relation of $n_x > n_z > n_y$ where $n_x$ and $n_y$ respectively represent the refractive indices in the direction of film plane of the birefringent plate (provided $n_x > n_y$) and $n_z$ represents the refractive index in the direction of film thickness of the birefringent plate.

Further, the present invention is to provide a liquid crystal display device comprising a liquid crystal layer of a nematic liquid crystal having positive dielectric anisotropy and including a chiral material, the liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and at least one birefringent plate provided between the liquid crystal layer and the polarizing plate at at least one side of the liquid crystal layer, characterized in that the product $\Delta n_1 \cdot d_1$ of the anisotropy of refractive index $\Delta n_1$ of liquid-crystal molecules in the liquid crystal layer and the thickness $d_1$ of the liquid crystal layer is in a range of 0.4–1.5 µm, and the birefringent plate is a uniaxial birefringent plate wherein three main refractive indices $n_x$, $n_y$ and $n_z$ of the birefringent plate are in a relation of $n_x = n_z > n_y$ where $n_x$ and $n_x$ respectively represent the refractive indices in the direction of film plane of the birefringent plate and $n_z$ represents the refractive index in the direction of film thickness of the birefringent plate.

Further, the present invention is to provide a liquid crystal display device comprising a liquid crystal layer of a nematic liquid crystal having positive dielectric anisotropy and including a chiral material, said liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and plural birefringent plates provided between the liquid crystal layer and the polarizing plate at one side or both sides of said liquid crystal layer, characterized in that the product $\Delta n_1 \cdot d_1$ of the anisotropy of refractive index $\Delta n_1$ of liquid crystal molecules in the liquid crystal layer and the thickness $d_1$ of the liquid crystal layer is in a range of 0.4–1.5 µm, said plural birefringent plates comprises at least one uniaxial birefringent plate having the optical axis in its film plane to provide a relation of $n_{x1} > n_{y1} = n_{z1}$ wherein $n_{x1}$, $n_{y1}$, $n_{z1}$ represent three main refractive indices of the birefringent plate wherein $n_{x1}$ and $n_{y1}$ respectively represent the refractive indices in the direction of film plane of the birefringent plate (provided $n_{x1} > n_{y1}$) and $n_{z1}$ represents the refractive index in the direction of film thickness of the birefringent plate, and at least one uniaxial birefringent plate having the optical axis in the direction of film thickness to provide a relation of $n_{z2} > n_{x2} = n_{y2}$ wherein $n_{x2}$, $n_{y2}$, $n_{z2}$ represent three main refractive indices of the uniaxial birefringent plate wherein $n_{x2}$ and $n_{y2}$ respectively represent the refractive indices in the direction of film plane of the birefringent plate (provided $n_{x2} = n_{y2}$) and $n_{z1}$ represents the refractive index in the direction of film thickness of the birefringent plate, said plural birefringent plates being so arranged to have a relation of $n_x > n_z > n_y$, wherein main refractive indices in arithmetical mean in the three direction intersecting at a right angle of the plural birefringent plates taking the thickness of the plates in consideration are represented by $n_x$, $n_y$ and $n_z$, where $n_x$ and $n_y$ respectively represent the refractive indices in the direction of film plane of the birefringent plates (provided $n_x > n_y$) and $n_z$ represents the refractive index in the direction of film thickness of the birefringent plates.

Further, in accordance with the present invention, there is provided a liquid crystal display device comprising a liquid crystal layer of a nematic liquid crystal having positive dielectric anisotropy and including a chiral material, the liquid crystal layer being interposed between a pair of substrates with transparent electrodes each having an aligning layer which are arranged substantially in parallel to provide a twist angle of 160°–300°, a driving means to apply a voltage across the electrodes attached to the substrates which interpose the liquid crystal layer, a pair of polarizing plates arranged outside the liquid crystal layer, and birefringent plates provided between the liquid crystal layer and the polarizing plate at both sides of the liquid crystal layer, characterized in that the product $\Delta n_1 \cdot d_1$ of the anisotropy of refractive index $\Delta n_1$ of liquid crystal molecules in the liquid crystal layer and the thickness $d_1$ of the liquid crystal layer is in a range of 0.4–1.5 µm; the birefringent plates comprises first uniaxial birefringent plates each having the optical axis in its plane to provide a relation of $n_{x1} > n_{y1} = n_{z1}$ wherein $n_{x1}$, $n_{y1}$ and $n_{z1}$ represent three main refractive indices of the birefringent plate where $n_{x1}$ and $n_{y1}$ represent the refractive indices in the direction-of film plane of the birefringent plate (provided $n_{x1} > n_{y1}$) and $n_{z1}$ represents the refractive index in the direction of film thickness of the birefringent plate, and second uniaxial birefringent plates each having the optical axis in the direction of film thickness to provide a relation of $n_{z2} > n_{x2} = n_{y2}$ wherein $n_{x2}$, $n_{y2}$ and $n_{z2}$ represent main refractive indices of the uniaxial birefringent plate where $n_{x2}$ and $n_{y2}$ represent the refractive indices in the direction of film plane of the birefringent plate (provided $n_{x2} = n_{y2}$) and $n_{z2}$ represents the refractive index in the direction of film thickness of the birefringent plate; the birefringent plates provided at both sides of the liquid crystal layer are constituted by laminated birefringent plates which are formed by interposing a single first uniaxial birefringent plate between a pair of the second uniaxial birefringent plates; and the laminated birefringent plates are so arranged to have a relation of $0.1 \leq (n_z - n_y)/(n_x - n_y) \leq 3$ wherein main refractive indices in arithmetical mean in three direction intersecting at a right angle of the laminated birefringent plates taking the thickness of the plates in consideration are $n_x$, $n_y$ and $n_z$, where $n_x$ and $n_y$ respectively represent the refractive indices in the direction of film plane of the birefringent plates (provided $n_x > n_y$) and $n_z$ is the refractive index in the direction of film thickness of the birefringent plates.

In the present invention, a birefringent plate is arranged between the liquid crystal layer and the polarizing plate at one side or both sides of the liquid crystal layer wherein when three main refractive indices are expressed by $n_x$, $n_y$ and $n_z$ where $n_x$ and $n_y$ represent the refractive indices in the direction of film plane of the birefringent plate (provided $n_x > n_y$) and $n_z$ represents the refractive index in the direction of film thickness of the birefringent plate, a relation of $n_x \geq n_z > n_y$ is provided.

Specifically, a biaxial birefringent plate to provide a relation of $n_x > n_z > n_y$ is arranged between the liquid crystal layer and the polarizing plate at one side or both sides of the liquid crystal layer wherein $n_x$, $n_y$ and $n_z$ represent three main -refractive indices where $n_x$ and $n_y$ represent the refractive indices in the direction of film plane of the birefringent plate (provided $n_x > n_y$) and $n_z$ represents the refractive index in the direction of film thickness of the birefringent plate. Or, a uniaxial birefringent plate to provide a relation of $n_x = n_z > n_y$ is arranged instead of the biaxial birefringent plate. Or, a birefringent plate comprising in combination, a uniaxial birefringent plate ($n_x > n_y = n_z$) having the optical axis in the film plane and a uniaxial birefringent plate ($n_z > n_x = n_y$) having the optical axis in the direction of film thickness (in the direction perpendicular to the film plane) is arranged so that the birefringence is principally $n_x > n_z > n_y$ in total.

With use of only a single layer of the liquid crystal, a liquid crystal display device having a bright monochrome display can be easily obtained without the second liquid crystal layer which may reduce productivity and cause unevenness in color. Further, a liquid crystal display device having a monochrome display with a wide viewing angle which minimizes the deterioration in quality of a display viewed from an oblique direction can be easily obtained in comparison with a case of using a conventional uniaxial birefringent plate having a relation of $n_x > n_y = n_z$.

In the present invention, in a case that a combination of two kinds of uniaxial birefringent plates are used wherein the two kinds of the uniaxial birefringent plates are respectively arranged between the liquid crystal layer and the polarizing plate at both sides of the liquid crystal layer, the same effect is obtainable provided that a value of $(n_z - n_y)/(n_x - n_y)$ is 3 or lower even though there is a relation of $n_z \geq n_x$. The liquid crystal layer has the same construction as that for a conventional super twist liquid crystal display device, and has opposing electrode groups so that they are subjected to ON-OFF control for each dot. The twist angle of the liquid crystal layer is in a range of about 160°–300°.

Specifically, it may be such that a nematic liquid crystal having positive dielectric anisotropic and including a chiral material is interposed between a pair of substrates with transparent electrodes which are arranged substantially in parallel, and the twist angle of liquid crystal molecules between the electrodes of the substrates is determined to be 160°–300°. If the angle is less than 160°, improvement in the contrast ratio during multiplexing driving with a high duty which requires a steep change in transmittance, can not be expected. On the contrary, if the twist angle exceeds 300°, there easily causes a domain to effect a hysteresis loss or light-scattering.

The product $\Delta n_1 \cdot d_1$ of the anisotropy of refractive index ($\Delta n_1$) of liquid crystal molecules of the liquid crystal layer and the thickness ($d_1$) of the liquid crystal layer is in a range of 0.4–1.5 μm. If the product $\Delta n_1 \cdot d_1$ is less than 0.4 μm, the transmittance is low at an ON state and the color of a display shows a bluish tone. On the other hand, if it exceeds 1.5 μm, the color phase at an ON state shows a color of yellow-red, and it is difficult to obtain a monochrome display. When requirements for a non-colored display is severe, the product $\Delta n_1 \cdot d_1$ of the liquid crystal layer is preferably in a range of 0.5–1.0 μm. The range of the product $\Delta n_1 \cdot d_1$ should be satisfied in a temperature range when the liquid crystal display device is used. A beautiful display can be obtained in the temperature range. However, the above-mentioned range may be satisfied at only part of the temperature range due to an additional requirement for the performance. When the temperature range is suitable and the range of $\Delta n_1 \cdot d_1$ is out of the above-mentioned range, a colored display may result or viewing angle characteristic may decrease.

In preparation of the liquid crystal display device, a polyimide film, a polyamide film or the like is formed on a surface of a substrate such as plastics, glass or the like on which transparent electrodes made of a material of ITO ($In_2O_3$—$SnO_2$), $SnO_2$ or the like are formed with a predetermined pattern. The surface of the polyimide film or the polyamide film is rubbed or is subjected to an oblique vapor deposition of $SiO_2$ to form an orientation layer. Then, the above-mentioned liquid crystal layer of a nematic liquid crystal having positive dielectric anisotropy and having a twist angle of 160°–300° is interposed between the substrates with the transparent electrodes. As a typical example, there is a dot matrix type liquid crystal display device in which a number of aligning electrodes are formed. Namely, 640 electrodes are formed in form of stripes on one substrate, and 400 electrodes are formed in form of stripes so as to be perpendicular thereto on the other substrate so that a display of 640×400 dots is obtainable. A fully colored 640×400 dots display can be obtained by grouping the 640 electrodes arranged in form of stripes by a set of three electrodes so that 1,920 electrodes in form of stripes are produced and color filters of R, G and B are arranged to the 1,920 electrodes.

An insulating layer made of a material such as $TiO_2$, $SiO_2$, $Al_2O_3$ or the like may be formed between the electrodes and the orientation layer in order to prevent a short circuit of the electrodes to the substrates. Leading electrodes having a low resistance made of a material such as Al, Cr, Ti or the like may be attached to the transparent electrodes. Further, color filters may be disposed on or below the electrodes.

A pair of polarizing plates are arranged at both outer sides of the liquid crystal layer. Although each of the polarizing plates is generally arranged at the outer side of the substrate which constitutes a part of the cell, the substrate itself may be constituted by the polarizing plate and the birefringent plate, or a birefringent layer or a polarizing layer may be formed between the substrate and the electrode if the performance is satisfied.

In the present invention, the birefringent plate may be placed between the liquid crystal layer and the polarizing plate at one side or both sides of the liquid crystal layer. For instance, it is provided in a form of layer between the liquid crystal layer and the electrode; it may be formed in a form of layer between the electrode and the substrate; the substrate itself may be a birefringent plate; the birefringent plate may be placed in a form of layer between the substrate and a polarizing plate; or a combination of the above-mentioned structure may be used. The birefringent plate used in the present invention may be a transparent plate having birefringence which will be described hereinafter. As the transparent plate, a plastic film, a crystalline plate of inorganic material or the like may be used.

The birefringent plate used in the present invention is such one that a single or plural birefringent plates show a nature of $n_x \geq n_z > n_y$ as a whole wherein $n_x$, $n_y$ and $n_z$ represent three main refractive indices where $n_x$ and $n_y$ represent the refractive indices in the direction of film plane of the birefringent plate (provided $n_x > n_y$) and $n_z$ represents the refractive index in the direction of the film thickness of the birefringent plate. In the present invention, the optical axis of the birefringent plate is referred to a direction which shows different refractive index in a uniaxial birefringent plate and in a biaxial birefringent plate, it is defined as a direction having a large refractive index in the film plane for convenience' sake (in this case, a direction of x).

Specifically, there are the following embodiments.

① A single or more than two biaxial birefringent plates which exhibit $n_x > n_z > n_y$ are arranged at one side or both sides of the liquid crystal layer. In the present invention, the optical axis of this case is the direction of x as described above.

② A single or more than two uniaxial birefringent plates which exhibit $n_x = n_z > n_y$ are arranged at one side or both sides of the liquid crystal layer.

In the present invention, the optical axis of this case is a direction of y as described above.

③ In a combination of a uniaxial birefringent plate ($n_{x1} > n_{y1} = n_{z1}$) having the optical axis in the film plane and a uniaxial birefringent plate ($n_{z2} > n_{x2} = n_{y2}$) having the optical axis in the direction of film thickness (perpendicular to the film plane), the combined birefringent plates which exhibit principally $n_x > n_z > n_y$ as a whole are arranged at one side or both sides of the liquid crystal layer.

However, in a case that a laminated type birefringent plate of such a structure that a uniaxial birefringent plate having the optical axis in film plane is interposed between uniaxial birefringent plates each having the optical axis in the direction of the film thickness is arranged at each side of the liquid crystal layer, it is enough to use laminated type birefringent plates which exhibit as a whole the birefringence of $0.1 \leq (n_z - n_y)/(n_x - n_y) \leq 3$.

Now, description will be made as to $n_x$, $n_y$ and $n_z$ in a case that plural birefringent plates are combined.

Assuming that i number of uniaxial birefringent plates wherein each optical axis is in the direction of x axis in the film plane wherein the main refractive indices in three directions of each plate are respectively expressed by $n_{x1i}$, $n_{y1i}$ and $n_{z1i}$ (provided $n_{x1i} > n_{y1i} = n_{z1i}$) and the film thickness is expressed by $d_{21i}$, and j number of uniaxial birefringent plates wherein each optical axis is in the direction of z axis which is the direction of film thickness wherein the main refractive indices in the three directions of each of the plates are respectively expressed by $n_{x2j}$, $n_{y2j}$ and $n_{z2j}$ (provided $n_{z2j} > n_{x2j} = n_{y2j}$) and the film thickness is expressed by $d_{22j}$. In this case, the arithmetical mean $n_x$, $n_y$ and $n_z$ of the refractive indices in the three directions taking the thickness into consideration can be expressed as follows:

$$n_x = (\Sigma_i n_{x1i} \cdot d_{21i} + \Sigma_j n_{x2j} \cdot d_{22j})/d_2$$

$$n_y = (\Sigma_i n_{y1i} \cdot d_{21i} + \Sigma_j n_{y2j} \cdot d_{22j})/d_2$$

$$n_z = (\Sigma_i n_{z1i} \cdot d_{21i} + \Sigma_j n_{z2j} \cdot d_{22i})/d_2$$

$$d_2 = \Sigma_i d_{21i} + \Sigma_i d_{22j}$$

In order to obtain a desired effect of birefringence, $\Delta n_2 \cdot d_2 = (n_x - n_y) \cdot d_2$ or $(n_{x1} - n_{y1}) \cdot d_{21}$ or $(n_{z2} - n_{x2}) \cdot d_{22}$ is adjusted. However, when it is impossible to adjust it in a single birefringent plate, plural birefringent plates having the same or different nature may be combined. It is important to optimize the magnitude of $\Delta n_2 \cdot d_2$ of the birefringent plate to a liquid crystal layer having a specified twist angle and $\Delta n_1 \cdot d_1$, the direction of bonding the birefringent plate to the liquid crystal layer, or the direction of the polarizing axes of the paired polarizing plates, in order to obtain an excellent monochrome display.

Further, an excellent monochrome display is easily obtainable by determining the magnitude of $\Delta n_2 \cdot d_2$ in total of the birefringent plates to be substantially the same as or slightly smaller than the magnitude of $\Delta n_1 \cdot d_1$ of the liquid crystal layer. Specifically, about 0.1–1.5 μm is preferable.

Since the birefringent plates are arranged at both sides of the liquid crystal layer, the magnitude of $\Delta n_2 \cdot d_2$ of the birefringent plates should be substantially one half or slightly smaller than one half of the magnitude of $\Delta n_1 \cdot d_1$ of the liquid crystal layer in order to obtain an excellent monochrome display. Specifically, about 0.05–0.75 μm is preferable. When plural birefringent plates are used in an overlapping state, the value of $\Delta n_2 \cdot d_2$ should be in the above-mentioned range as a whole.

In order to improve the angle dependency, it is necessary to adjust $n_z$.

In the present invention, the value of $(n_z - n_y)/(n_x - n_y)$ should be 0.1 or more because a sufficient effect of the uniaxial birefringent plate can not be obtained if the value is less than 0.1.

IN THE DRAWINGS

FIGS. 1 through 4 are respectively perspective views showing embodiments of the liquid crystal display device of the present invention in forms of model wherein FIG. 1 shows an embodiment that a birefringent plate is arranged at one side of a liquid crystal layer; FIG. 2 shows an example that a birefringent plate is arranged at both sides of the liquid crystal layer; FIG. 3 shows an example that plural birefringent plates are arranged at one side of the liquid crystal layer, and FIG. 4 shows an example that plural birefringent plates are respectively arranged at both sides of the liquid crystal layer;

FIG. 5(A) is a plane view showing a relative position of the direction of the polarizing axis of the upper polarization plate of the liquid crystal display device, the direction of the main refractive index $n_x$ of the birefringent plate and the direction of the long axis of a liquid crystal molecule at the upper part of the liquid crystal layer of the liquid crystal display device as shown in FIG. 1 or 3 when the device is viewed from the top;

FIG. 5(B) is a plane view showing a relative position of the polarization axis of the lower polarizing plate and the direction of the long axis of a liquid crystal molecule at the lower part of the liquid crystal layer of the liquid crystal display device as shown in FIG. 1 or FIG. 3 when the device is viewed from the top;

FIG. 6(A) is a plane view showing a relative position of the direction of the polarization axis of the upper polarizing plate, the direction of the main refractive index $n_x$ of the upper birefringent plate and the direction of the long axis of a liquid crystal molecule at the upper part of the liquid crystal layer of the liquid crystal display device as shown in FIG. 2 or FIG. 4 when the device is viewed from the top;

Figure 9A:
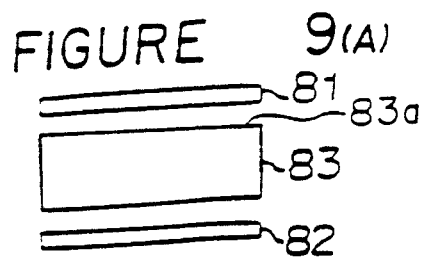
Figure 17:
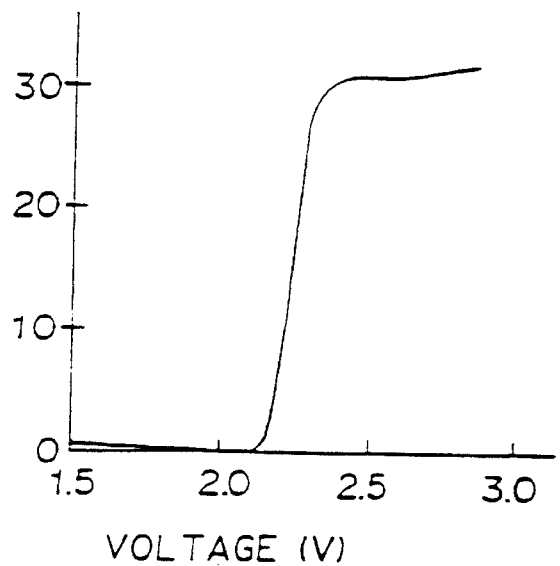
Figure 16:
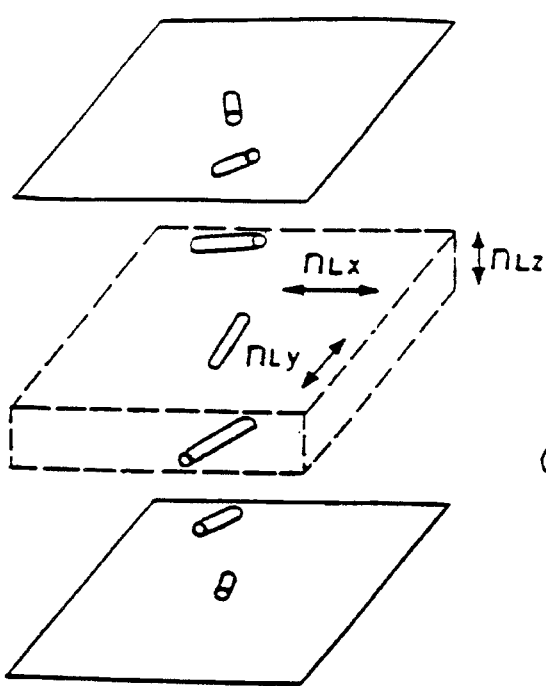
Figure 18:
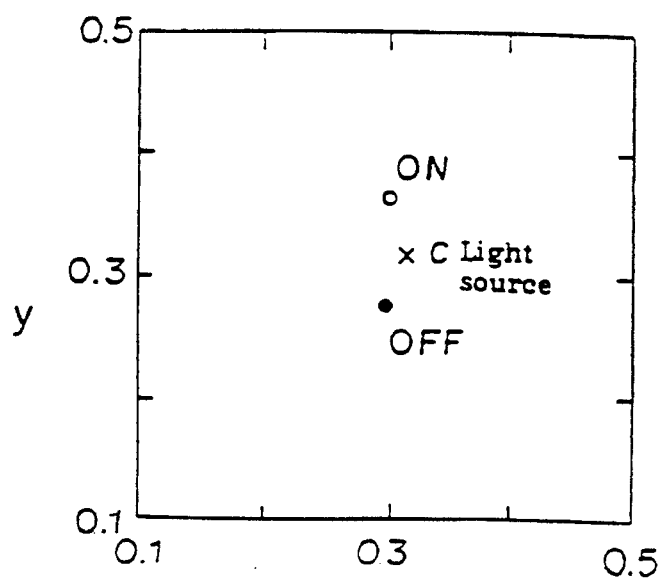

FIGS. 9(A),(B) through 15(A),(B) are respectively diagrams for explaining effects obtained by using the birefringent plate(s) of the present invention wherein the parts (A) are respectively side views in forms of model of the liquid crystal display devices, and the parts (B) are respectively diagrams showing states of polarization of light;

FIG. 16 is a diagram showing the arrangement of liquid crystal molecules in the liquid crystal cell;

FIG. 17 is a graph showing the threshold voltage characteristic of the liquid crystal in the embodiments of the present invention;

FIG. 18 is a diagram showing the hue at the ON state or the OFF state in the embodiments of the present invention; and FIGS. 19 through 53 are respectively diagrams showing the equi-contrast distribution curves in Examples of the present invention and the Comparative Examples.

BEST MODE OF CARRYING OUT THE INVENTION

Preferred embodiment of the present invention will be described with reference to the drawings.

Figure 1:
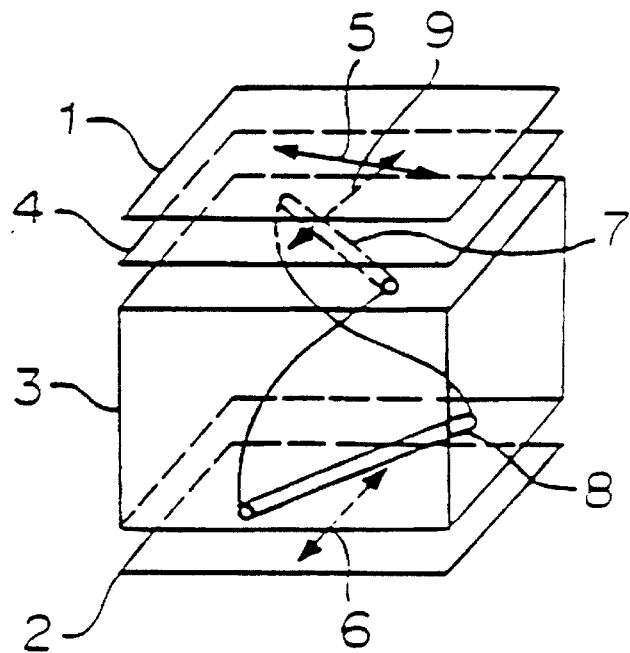

FIG. 1 shows an embodiment of the present invention wherein a birefringent plate is arranged at one side of the liquid crystal layer wherein reference numerals 1 and 2 designate a pair of polarizing plates, a numeral 3 designates a liquid crystal layer of a nematic liquid crystal having positive dielectric anisotropy, a value $\Delta n_1 \cdot d_1$ of 0.4–1.5 μm and a left-spiral structure (a structure having a twist angle in the counter clockwise direction viewed from the top) having a twist angle of 160°–300°, the liquid crystal layer being adapted to display characters and/or figures, a numeral 4 designates a birefringent plate arranged at one side of the liquid crystal layer, a numeral 5 designates the polarization axis of the upper polarizing plate, a numeral 6 designates the polarization axis of the lower polarizing plate, a numeral 7 designates the direction of the long axis of a liquid crystal molecule at an upper part of the liquid crystal layer, a numeral 8 designates the direction of long axis of a liquid crystal molecule at the lower part of the liquid crystal layer and a numeral 9 designates the direction of the optical axis of the birefringent plate.

Figure 7:
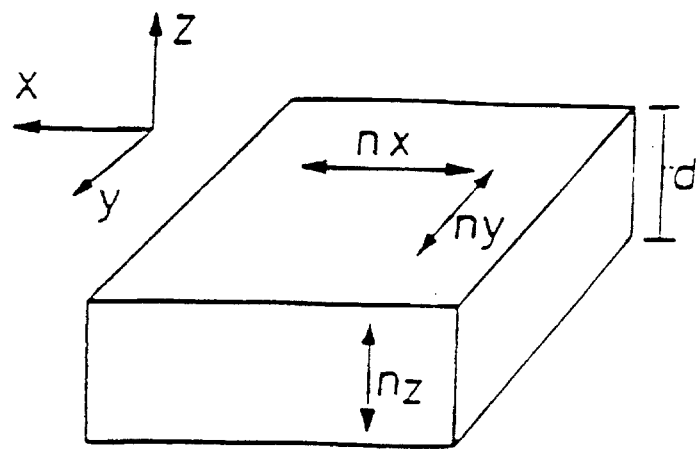
FIGS. 7 and 8 are respectively diagrams for explaining the definition of the main refractive indices of the birefringent plate(s)

The definition of the main refractive indices of the birefringent plate used in the present invention will be described with reference to FIG. 7.

The birefringent plate arranged at one side of the liquid crystal layer may be a biaxial birefringent plate to provide a relation of $n_x > n_z > n_y$ wherein the refractive indices are different in three directions of x, y and z, or a uniaxial birefringent plate having a relation of $n_x = n_z > n_y$. In the determination of the three directions, the direction having a larger refractive index in the film plane of the birefringent plate is to be an x axis, the direction having a smaller refractive index is to be a y axis and the direction of thickness is to be a z axis. The refractive indices of the x, y and z axes are respectively $n_x$, $n_y$ and $n_z$ wherein $n_x > n_y$ and $\Delta n_2 = n_x - n_y$. In the present invention, $n_x \geq n_z > n_y$. A character d designates the thickness of the birefringent plate.

The optical axis of the birefringent plate used for the present invention represents the direction having a different refractive index for the uniaxial birefringent plate, and is defined as the direction in which the main refractive index in the film plane is large for the biaxial birefringent plate for convenience' sake. Specifically, the optical axis of the biaxial birefringent plate having a relation of $n_x > n_z > n_y$ is in the x direction, the optical axis of the uniaxial birefringent plate having $n_x = n_z > n_y$ is in the y direction, the optical axis of the uniaxial birefringent plate having $n_x > n_y = n_z$ is in the x direction, and the optical axis of the uniaxial birefringent plate having $n_z > n_x = n_y$ wherein the optical axis directs in the film thickness is in the z direction.

Figure 5A:
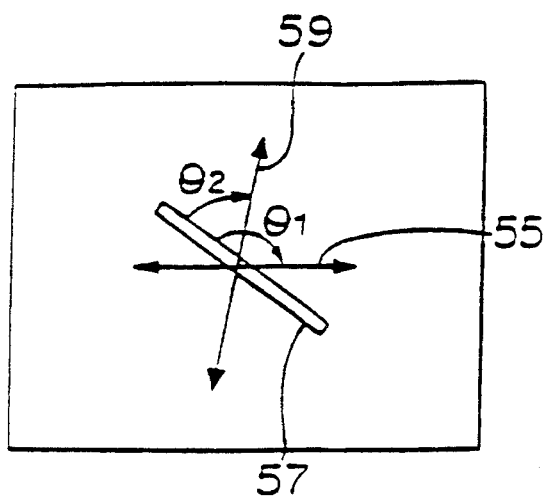
Figure 5B:
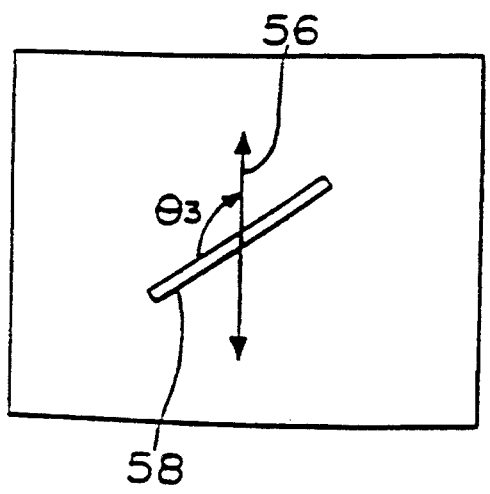

In FIG. 5, a character $\theta_1$ designates an angle obtained by measuring clockwisely the direction of the polarization axis 55 of the upper polarizing plate from the direction of the long axis of a liquid crystal molecule 57 at the upper part of the liquid crystal layer, a character $\theta_2$ designates an angle obtained by measuring clockwisely the direction of the optical axis 59 of the birefringent plate from the direction of the long axis of the liquid crystal molecule 57 at the upper part of the liquid crystal layer, and a character $\theta_3$ designates an angle obtained by measuring clockwisely the direction of the polarization axis 56 of the lower polarizing plate from the direction of the long axis of a liquid crystal molecule 58 at the lower part of the liquid crystal layer. In the present invention, the angles $\theta_1$, $\theta_2$ and $\theta_3$ are optimally determined so as to provide a monochrome display.

In a case that the liquid crystal display device of the present invention is used as a negative type display device and let assume that the twist angle of the liquid crystal layer is about 240°, the value $\Delta n_1 \cdot d_1$ is about 0.87 μm and the value $\Delta n_2 \cdot d_2$ of the birefringent plate placed above the liquid crystal layer is about 0.58 μm, the polarization axes of the paired polarizing plates should be crossed at an angle of about 0°–60°.

In a case that the display device is used as a positive type display device, it is preferable that the polarizing plate arranged at one side of the liquid crystal layer is so arranged that the polarization axis of the polarizing plate is turned about 90°. With such arrangement, the liquid crystal display device enables to provide a monochrome display having a high contrast and a wide viewing angle.

When the liquid crystal display device is used as a negative type display device wherein a biaxial birefringent plate is used, it is preferable that $40° \leq \theta_2 \leq 140°$. Then, it is obtainable a display wherein the transmittance at an OFF state is low whereas the transmittance at ON state is high and a sufficient contrast is provided. Especially, when $60° \leq \theta_2 120°$, the transmittance at an OFF state is sufficiently low and a high contrast ratio is obtainable.

The optical axis of the uniaxial birefringent plate having $n_x = n_z > n_y$ is in the y direction. Namely, the optical axis shifts 90° with respect to the above-mentioned case. Accordingly, $-50° \leq \theta_2 \leq 50°$, preferably, $-30° \leq \theta_2 \leq 30°$.

When a liquid crystal layer having a spiral structure which is opposite the left-spiral structure is used, a monochrome display can be easily obtained in the same manner as the above-mentioned case by selecting suitably the angles $\theta_1$, $\theta_2$ and $\theta_3$ in the counterclockwise direction in relation to the direction of the long axis of a liquid crystal molecule of the liquid crystal layer, the direction of the polarization axis of the polarizing plate and the direction of the optical axis of the birefringent plate.

In a case that the birefringent plate is placed below the liquid crystal cell, the above-mentioned angles $\theta_1$, $\theta_2$ and $\theta_3$ should be selected so as to have the same relation as described above provided that the cell is viewed from the bottom.

In the present invention, when the uniaxial birefringent plate having $n_x \geq n_z > n_y$ is used, coloring which appears when viewed from an oblique direction can be suppressed; appearance is improved; a region which causes the inversion of black and white can be narrowed; and the viewing angle can be broaden.

Figure 2:
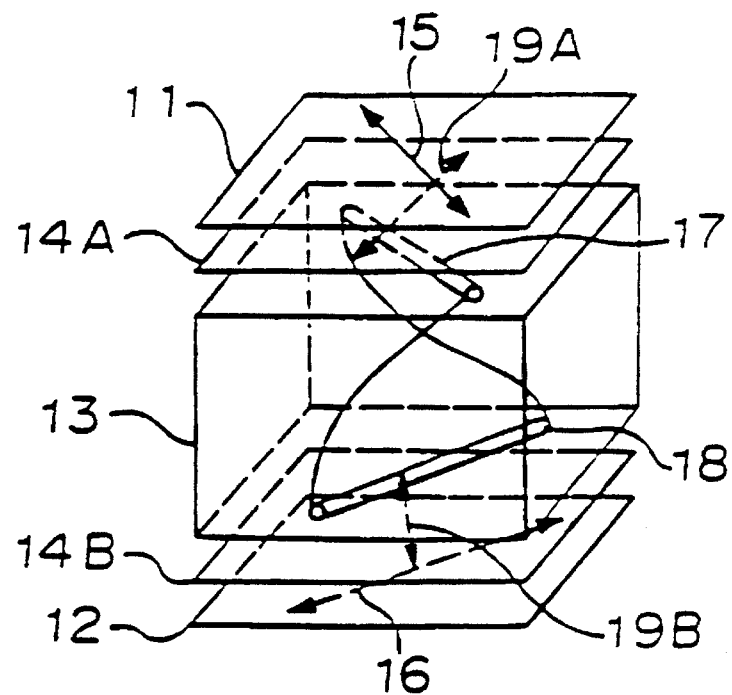

FIG. 2 shows an example that each birefringent plate is arranged at both sides of the liquid crystal layer. In FIG. 2, numerals 11, 12 designate a pair of polarizing plates, a numeral 13 designates a liquid crystal layer of a nematic liquid crystal having positive dielectric anisotropy wherein the value $\Delta n_1 \cdot d_1$ is 0.4–1.5 μm and a left-spiral structure having a twist angle of 160°–300°, numerals 14A, 14B designate birefringent plates arranged above and below the liquid crystal layer, numerals 15, 16 designate polarization axes, numerals 17, 18 designate the directions-of the long axis of liquid crystal molecules, a numeral 19A designates the direction of the optical axis of the upper birefringent plate, and a numeral 19B designates the direction of the optical axis of the lower birefringent plate.

Figure 6A:
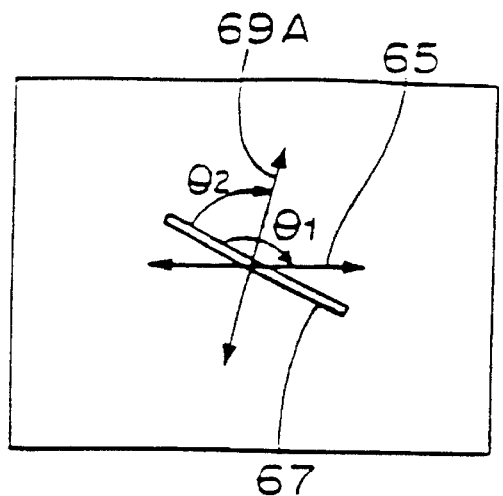
FIG. 6(B) is a plane view showing a relative position of the direction of the polarization axis of the lower polarizing plate, the direction of the main refractive index $n_x$ of the lower birefringent plate and the direction of the long axis of a liquid crystal molecule at the lower part of the liquid crystal display device as shown in FIG. 2 or FIG. 4 when the device is viewed from the top.
Figure 6B:
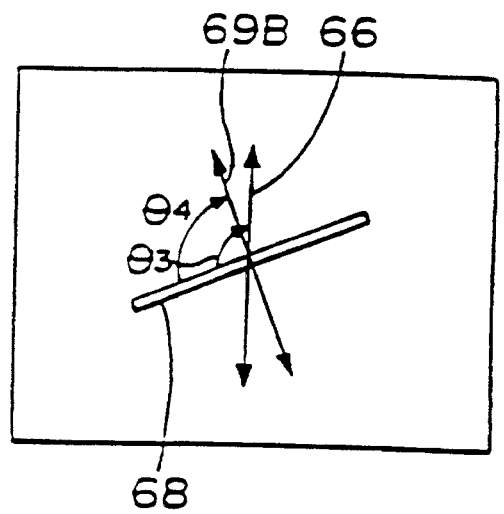

In FIG. 6, a character $\theta_1$ designates an angle obtained by measuring clockwisely the direction of the polarization axis 65 of the upper polarizing plate from the direction of the long axis of a liquid crystal molecule 67 at the upper part of the liquid crystal layer, a character $\theta_2$ designates an angle obtained by measuring clockwisely the direction of the optical axis 69A of the upper birefringent plate from the direction of the long axis of the liquid crystal molecule 67 at the upper part of the liquid crystal layer, a character $\theta_3$ designates an angle obtained by measuring clockwisely the direction of the polarization axis 66 of the lower polarizing plate from the direction of the long axis of a liquid crystal molecule 68 at the lower part of the liquid crystal layer, and a character $\theta_4$ designates an angle obtained by measuring clockwisely the direction of the optical axis 69B of the lower birefringent plate from the direction of the long axis of the liquid crystal molecule 68 at the lower part of the liquid crystal layer. In the present invention, these angles $\theta_1$, $\theta_2$, $\theta_3$ and $\theta_4$ are optimally selected to obtain a monochrome display.

In a case that the liquid crystal display device of the present invention is used as a negative type display device, and let assume that the twist angle of the liquid crystal layer is about 240°, the value $\Delta n_1 \cdot d_1$ is about 0.80 μm and the value $\Delta n_2 \cdot d_2$ of the pair of birefringent plates arranged above and below the liquid crystal layer are respectively about 0.40 μm (about 0.80 μm in total), a good result is obtainable by arranging the pair of polarizing plates so that their polarization axes are crossed at an angle of about 60°–120°.

In a case that the liquid crystal device is used as a positive type display device wherein the same birefringent plates and the liquid crystal layer are used, it is preferable that either polarizing plate is arranged so that the polarization axis is turned by about 90°. With such arrangement, the liquid crystal display device enables to provide a monochrome display having a high contrast ratio and a wide viewing angle.

When the biaxial birefringent plates are used and a negative display is to be provided, it is preferably for the angles $\theta_2$ and $\theta_4$ to be respectively $5°\leq\theta_2\leq140°$ and $40°\leq\theta_4\leq170°$, more preferably $40°\leq\theta_2\leq140°$ and $40°\leq\theta_4\leq140°$ whereby a display having a low transmittance at an OFF state, a high transmittance at an ON state and a sufficient contrast ratio can be realized. Particularly, when $60°\leq\theta_2\leq120°$ and $60°\leq\theta_4\leq120°$, a sufficiently low transmittance at an OFF state and a sufficient contrast ratio can be obtained.

When the uniaxial birefringent plates having $n_x=n_z>n_y$ are used for the liquid crystal display device as shown in FIG. 2, the directions of the optical axes are y directions, hence the directions shift 90° with respect to the above-mentioned case. Accordingly, the angles $\theta_2$ and $\theta_4$ are respectively in ranges of $-85°\leq\theta_2\leq50°$ and $-50°\leq\theta_4\leq80°$, more preferably, $-50°<\theta_2\leq50°$ and $-50°\leq\theta_4\leq50°$, most preferably, $-30°\leq\theta_2\leq30°$ and $-30°\leq\theta_4\leq30°$.

With respect to the angles $\theta_1$, $\theta_2$, $\theta_3$ and $\theta_4$, when $\theta_1<\theta_2$, it is preferable that $\theta_3<\theta_4$, and when $\theta_1>\theta_2$, it is preferable that $\theta_3>\theta_4$. By suitably selecting these angles in the above-mentioned ranges, the liquid crystal display device provides a monochrome display having a wide viewing angle and a high contrast ratio.

With respect to the optimum conditions obtained for the normal direction to the liquid crystal display device, a good result is obtainable even by using a conventional birefringent plate having its optical axis in the film plane and having a relation of $n_x>n_y=n_z$. However, when a uniaxial birefringent plate having a relation of $n_x>n_y=n_z$ is used to compensate the optical effect, such compensation is insufficient when viewed from an oblique direction and a picture image is colored. In the worst case, there causes the inversion of black and white even though a monochrome display having a high contrast ratio is obtainable in a case of the normal direction to the display device.

In the present invention, the coloring of an image can be avoided even when viewed from an oblique direction and the appearance can be improved by using a biaxial birefringent plate having a relation of $n_x>n_z>n_y$. When $n_z$ is greater than $n_x$ or smaller than $n_y$, angular dependence in the display device is reduced and the appearance when viewed from an oblique direction is decreased. Especially, when $(n_z-n_y)/(n_x-n_y)\geq 0.1$, a great effect is obtainable. As such birefringent plate, a biaxially oriented film, a biaxial crystal such as mica, gypsum, niter or the like may be used.

Explanation has been made, in order to simplify, on the assumption that the refractive index $n_z$ in the direction of film thickness of the birefringent plate is uniform in the direction of thickness. However, it is not always necessary to be uniform, but it is sufficient when an average refractive index in the direction of thickness satisfies the above-mentioned conditions. A fairly good result is obtainable even when $n_z$ is not uniform in the direction of thickness.

In the present invention, substantially the same effect of compensation as a case that the biaxial birefringent plate having a relation of $n_x>n_z>n_y$ even by using the uniaxial birefringent plate having a relation of $n_x=n_z>n_y$ for compensation.

Figure 3:
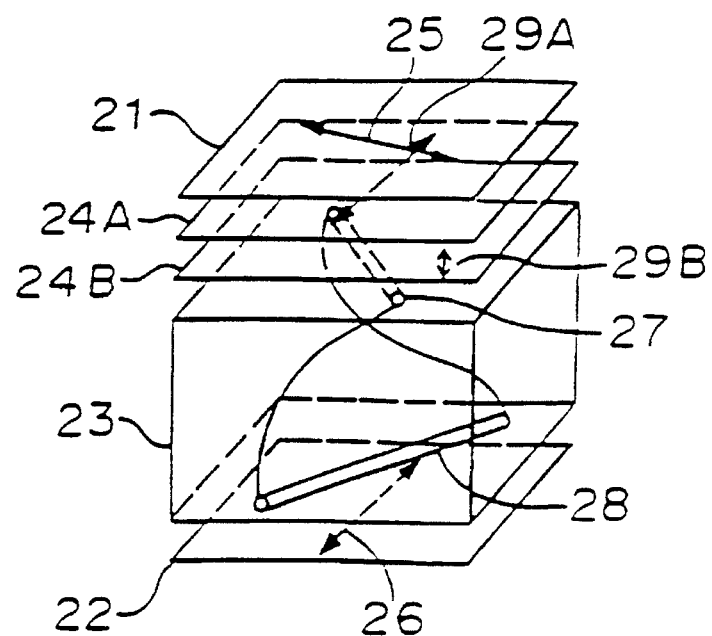

FIG. 3 shows an example that two birefringent plates are arranged in a laminated form at one side of the liquid crystal layer. In FIG. 3, numerals 21, 22 designate a pair of polarizing plates, a numeral 23 designates a liquid crystal layer of a nematic liquid crystal having positive dielectric anisotropy, a value $\Delta n_1 \cdot d_1$ of 0.4–1.5 μm and a left-spiral structure having a twist angle of 160°–300°, numerals 24A, 24B designate birefringent plates arranged in a laminated form at one side of the liquid crystal layer, numerals 25, 26 designate polarization axes, numerals 27, 28 designate the directions of the long axes of liquid crystal molecules, a numeral 29A designates the direction of the optical axis of the birefringent plate 24A having the optical axis in the direction of film plane, and a numeral 29B designates the direction of the optical axis of the birefringent plate 24B having the optical axis in the direction of thickness.

Definition of the refractive index in a case that two kinds of birefringent plates of the present invention are combined for use will be described with reference to FIG. 8.

Figure 8:
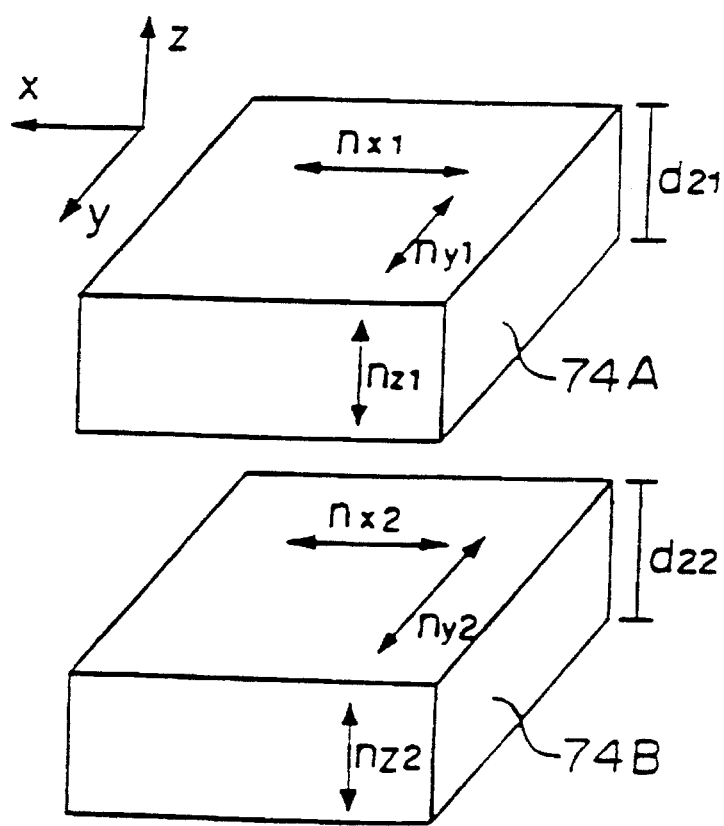

Let's assume that a coordinate is given as shown in FIG. 8. In FIG. 8, a reference numeral 74A designates a uniaxial birefringent plate having the optical axis in the direction of film plane and a thickness of $d_{21}$. When the direction of x axis is taken as the direction of the optical axis, the three main refractive indices $n_{x1}$, $n_{y1}$ and $n_{z1}$ have a relation of $n_{x1} > n_{y1} = n_{z1}$, A reference numeral 74B designates a uniaxial birefringent plate having the optical axis in the direction of film thickness and a thickness of $d_{22}$ wherein the three main refractive indices have a relation of $n_{z2} > n_{x2} = n_{y2}$.

In the present invention, it is necessary that relations of $n_x > n_z > n_y$ and $0.1 \leq (n_z - n_y)/(n_x - n_y)$ are respectively satisfied in the arithmetical mean in $n_x$, $n_y$ and $n_z$ of the respective three main refractive indices by taking the thickness of the birefringent plates into consideration.

Since two birefringent plates are laminated in this embodiment, the following equations are given.

$$n_x = \frac{n_{x1} \cdot d_{21} + n_{x2} \cdot d_{22}}{d_{21} + d_{22}}, \quad n_y = \frac{n_{y1} \cdot d_{21} + n_{y2} \cdot d_{22}}{d_{21} + d_{22}},$$

$$n_z = \frac{n_{z1} \cdot d_{21} + n_{z2} \cdot d_{22}}{d_{21} + d_{22}}$$

Since $n_x > n_z > n_y$, there is obtainable the following equations.

$$\frac{n_{x1} \cdot d_{21} + n_{x2} \cdot d_{22}}{d_{21} + d_{22}} > \frac{n_{y1} \cdot d_{21} + n_{y2} \cdot d_{22}}{d_{21} + d_{22}} >$$

$$\frac{n_{z1} \cdot d_{21} + n_{z2} \cdot d_{22}}{d_{21} + d_{22}}$$

In FIG. 5, a character $\theta_1$ designates an angle obtained by measuring clockwisely the direction of the polarization axis 55 of the upper polarizing plate from the direction of the long axis of a liquid crystal molecule 57 at the upper part of the liquid crystal layer, a character $\theta_2$ designates an angle obtained by measuring clockwisely the direction of the optical axis 59 of the birefringent plate (which has the optical axis in the direction of film plane) from the direction of the long axis of the liquid crystal molecule 57 at the upper part of the liquid crystal layer, and a character $\theta_3$ designates an angle obtained by measuring clockwisely the direction of the polarization axis 56 of the lower polarizing plate from the direction of the long axis of a liquid crystal molecule 58 at the lower part of the liquid crystal layer. Thus, in this case, the angles $\theta_1$, $\theta_2$ and $\theta_3$ are optimally selected so as to provide a monochrome display. The uniaxial birefringent plate having the optical axis in the direction of film thickness is simply inserted and has not direction dependence.

In a case that the liquid crystal display device is used as a negative type display device and it is assumed that the twist angle of the liquid crystal layer is about 240°, the value $\Delta n_1 \cdot d_1$ is about 0.87 μm, and the value $\Delta n_2 \cdot d_2$ of the birefringent plates laminated at one side of the liquid crystal layer is about 0.58 μm, it is preferable that the pair of polarizing plates are arranged so that the polarization axes of the plates are crossed at an angle of about 0°–60°.

In a case that the liquid crystal display device is used as a positive type display device wherein the same birefringent plates and liquid crystal layer are used, the polarizing plate at one side of the liquid crystal layer should be arranged with its polarization axis turned about 90°, whereby the liquid crystal display device having a monochrome display of an excellent viewing angle and a high contrast ratio can be obtained.

In this case, when the liquid crystal display device of the present invention is desired to be a negative type display device, the angle $\theta_2$ should be in a range of $40° \leq \theta_2 \leq 140°$, whereby a display having a low transmittance at an OFF state, a high transmittance at an ON state and a sufficient contrast ratio can be realized. Especially, when $60° \leq \theta_2 \leq 120°$, the transmittance at an OFF state is sufficiently low and the contrast ratio is sufficiently high.

As the birefringent plates used in the present invention, the birefringent plate having its optical axis in the direction of film plane may be an ordinary uniaxial birefringent plate such as a uniaxially orientated film or a crystal plate. The birefringent plate having its optical axis in the direction of film thickness may be a liquid crystal polymer film, an LB film, a crystal plate or the like. Further, birefringent plates may be such ones that the refractive index in the direction of film thickness is not always uniform.

Figure 4:
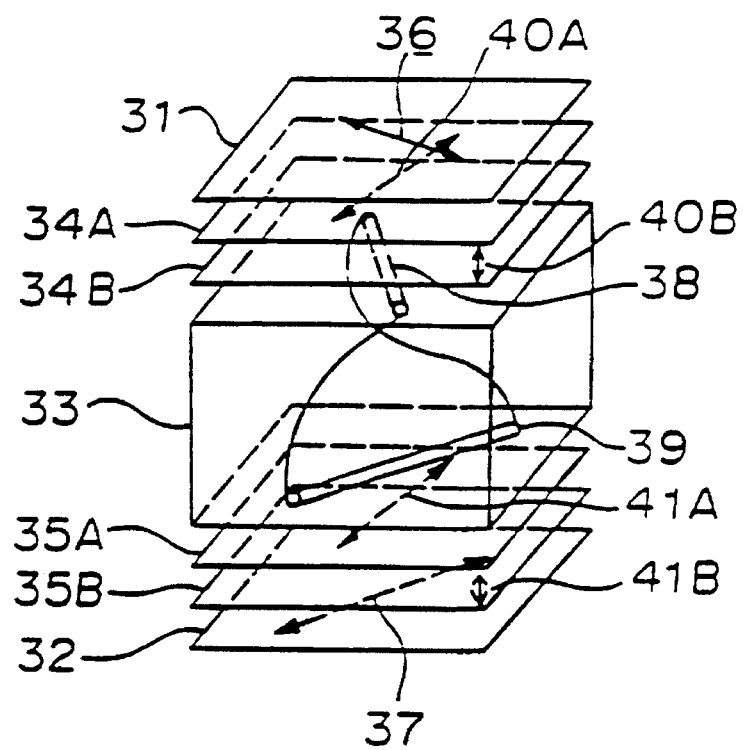

FIG. 4 shows an embodiment that two birefringent plates are respectively arranged in a laminated form at both sides of the liquid crystal layer. In FIG. 4, numerals 31, 32 designate a pair of polarizing plates, a numeral 33 designates a liquid crystal layer of a nematic liquid crystal having positive dielectric anisotropy, having a value $\Delta n_1 \cdot d_1$ of 0.4–1.5 μm and a left-spiral structure having a twist angle of 160°–300°, numerals 34A, 34B, 35A and 35B designate birefringent plates arranged above and below the liquid crystal layer, numerals 36, 37 designate polarization axes, numerals 38, 39 designate the directions of the long axis of liquid crystal molecules, numerals 40A, 41A designate the directions of the optical axes (the main refractive index $n_x$) of the birefringent plates 34A, 35A having their optical axes in the direction of film plane, and numerals 40B, 41B designate the directions of the optical axes (the main refractive index $n_z$) of the birefringent plates 34B, 35B having their optical axes in the direction of film thickness.

In FIG. 6, a character $\theta_1$ designates an angle obtained by measuring clockwisely the direction of the polarization axis 65 of the upper polarizing plate from the direction of the long axis of a liquid crystal molecule 67 at the upper part of the liquid crystal layer, a character $\theta_2$ designates an angle obtained by measuring clockwisely the direction of the optical axis 69A of the upper birefringent plate (the birefringent plate having its optical axis in the direction of film plane) from the direction of the long axis of the liquid crystal molecule 67 at the upper part of the liquid crystal layer, a character $\theta_3$ designates an angle obtained by measuring clockwisely the direction of the polarization axis 66 of the lower polarizing plate from the direction of the long axis of a liquid crystal molecule 68 at the lower part of the liquid crystal layer and a character $\theta_4$ designates an angle obtained by measuring clockwisely the direction of the optical axis 69B of the lower birefringent plate (the birefringent plate having its optical axis in the direction of film plane) from the direction of the long axis of the liquid crystal molecule 68 at the lower part of the liquid crystal layer. These angles $\theta_1$, $\theta_2$, $\theta_3$ and $\theta_4$ are optimally selected so as to provide an excellent monochrome display. The uniaxial birefringent plate having the optical axis in the direction of film thickness is simply inserted and has not direction dependence.

When the liquid crystal display device is used as a negative type display device and assuming that the twist angle of the liquid crystal layer is about 240°, the value $\Delta n_1 \cdot d_1$ is about 0.80 μm and the values $\Delta n_2 \cdot d_2$ of the paired birefringent plates which are respectively arranged above and below the liquid crystal layer are about 0.40 μm (about 0.80 μm in total), it is preferable that the paired polarizing plates are so arranged that their polarization axes are crossed at an angle of about 60°–120°.

When the liquid crystal display device is used as a positive type display device wherein the same liquid crystal layer and the birefringent plates are used, it is preferable that the paired polarizing plates are so arranged that their polarization axes are turned about 90°, whereby the liquid crystal display device can provide a monochrome display having an excellent viewing angle and a high contrast ratio.

When a negative type display is required for the liquid crystal display device, the angles $\theta_2$ and $\theta_4$ should respectively be in ranges of $5°\leq\theta_2\leq140°$ and $40°\leq\theta_4\leq170°$, especially, $40°\leq\theta_2\leq140°$ and $40°\leq\theta_4\leq140°$. With such arrangement, a display having a low transmittance at an OFF state, a high, transmittance at an ON state, and a sufficient contrast can be realized. In particular, when $60°\leq\theta_2\leq120°$ and $60°\leq\theta_4\leq120°$, the transmittance at an OFF state is. sufficiently low and the contrast ratio is sufficiently high.

With respect to the ranges of the values $\theta_1$, $\theta_2$, $\theta_3$ and $\theta_4$, when $\theta_1<\theta_2$, it is preferable that $\theta_3<\theta_4$. On the other hand, when $\theta_1>\theta_2$, it is preferable that $\theta_3>\theta_4$. By determining the ranges of the angles as described above, the liquid crystal display device can provide a monochrome display having excellent viewing angle characteristic and a high contrast ratio.

In the embodiment as shown in FIG. 4 which has such structure that a combination of the birefringent plate having its optical axis in the direction of film plane and the birefringent plate having its optical axis in the direction of film thickness is arranged at each side of the liquid crystal layer, when such laminated birefringent plates are so constructed that the uniaxial birefringent plate having its optical axis in the film plane is interposed between the uniaxial birefringent plates each having the optical axis in the direction of film thickness and the laminated birefringent plates are arranged at both sides of the liquid crystal layer, there is a region which gives a relation of $n_z>n_x>n_y$. In this case, a monochrome display having excellent viewing angle characteristic and a high contrast ratio can be obtained by using the laminated birefringent plates in which the birefringence of the laminated birefringent plates is $0.1\leq(n_z-n_y)/(n_x-n_y)\leq3$ in total.

In the present invention, since a display close to a monochrome display and having a large viewing angle can be obtained, it is possible to obtain a colored display with use of a color filter. Particularly, it is possible to obtain a full-colored gray scale because a high contrast ratio is possible even by a high duty driving. Accordingly, the liquid crystal device of the present invention is applicable to a liquid crystal TV. When the color filter is formed in the inner surface of the cell, there takes place no parallax in display depending on a different viewing angle, and a further fine color display is possible. Specifically, the color filter may be formed at the lower side of the electrode or at the upper side of the electrode. When an entirely monochrome display is required, a color filter for compensating color or a color polarizing plate may be additionally used, or a dye may be incorporated in the liquid crystal, or an illuminant having a specific wavelength distribution.

In the present invention, a driving means to apply a voltage to the electrodes is connected to thereby drive the liquid crystal cell having the above-mentioned construction.

Since a bright display can be provided in the present invention, the liquid crystal display device of the present invention can be applicable to a transmitting type or a reflecting type in a wider range. When the display device is used as a transmitting type, a light source should be disposed at the back side with or without a light conductor or a color filter.

Although the liquid crystal display device of the present invention is generally used as a transmitting type, it is possible to use it as a reflecting type because it provides a bright display. When it is used as a transmitting type, a light shielding film having a printed portion may be used to cover the background portion except the picture elements. Further, in addition to the use of the light shielding film, a selective voltage may be applied to a portion other than a displayed portion in order to drive the cell reversely. Various techniques applicable to the conventional liquid crystal display devices may be used for the present invention as far as the effect of the present invention is not impaired.

The liquid crystal display device of the present invention has the same multiplexing characteristics as a super twisted liquid crystal display device. Further, a clear and bright monochrome display can be obtained as described before. Accordingly, it is possible to realize a high density multicolor liquid crystal display device by arranging a fine color filter having three primary colors: red, green and blue at an appropriate position such as at an inner surface of the cell. The liquid crystal display device of the present invention is preferably used as a display device for a personal computer, a word processor, a work station or the like. Also, the display devices of the present invention is applicable to various display devices of a monochrome type or a color type such as a liquid crystal TV, a fishing soner, a radar, an oscilloscope, a dot matrix display device and so on.

Although the principle in operation of the present invention is not always clear, it can be considered as follows.

First, a case that the liquid crystal display device is viewed from the normal direction is considered.

FIG. 9(A) is a diagram showing the construction of a super twisted liquid crystal display device without using a birefringent plate, viewed from a side of it, in order to compare the super twisted liquid crystal display device with the liquid crystal display device of the present invention. The super twisted liquid crystal display device comprises a liquid crystal 83 of a nematic liquid crystal provided with a light shielding film 83a on the inner surface of the glass substrate of liquid crystal layer 83 covering the background portion of the liquid crystal display device and having positive dielectric anisotropy having a twist angle of 160°–300° and a value $\Delta n_1 \cdot d_1$ of 0.4–1.5 μm and a pair of polarizing plates 81, 82 disposed above and below the liquid crystal layer. In this structure, the crossing angle of the polarization axes of the pair of polarizing plates 81, 82 arranged above and below the liquid crystal layer is 90°.

Figure 9B:
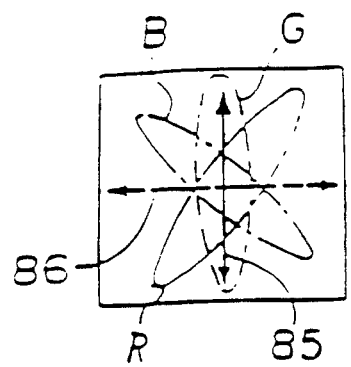

In the liquid crystal display device having the above-mentioned construction, when no voltage is applied to the liquid crystal layer or a low voltage such as a non-selective voltage is applied thereto, light entering into the lower polarizing plate 82 at the side of incidence is completely linearly polarized. When the linearly polarized light is transmitted to the liquid crystal layer 83, it becomes elliptically polarized light. The shape and direction of the elliptically polarized light vary depending on the wavelength of light. With respect to three primary colors: red, green, blue, the direction and shape of each of the colors are as in FIG. 9(B). When the three kinds of elliptically polarized light having different shape and direction pass the upper polarizing plate 81 at the side of emission, the intensity of light passing through the upper polarizing plate varies depending on red, green and blue lights so that light having a specified color is emitted. In FIG. 9(B), numerals 85, 86 designate the polarization axes of the polarizing plates 81, 82.

FIGS. 10 through 15 show the construction of the liquid crystal display devices of the present invention and states of polarization in the devices.

Figure 10A:
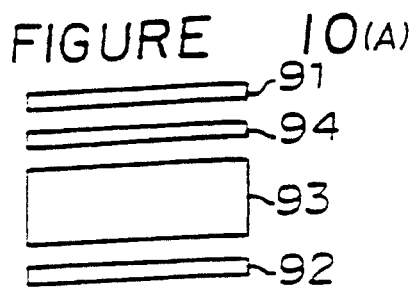

FIG. 10 shows an example wherein a biaxial birefringent plate having a relation of $n_x > n_z > n_y$ is arranged at one side of the liquid crystal layer. FIG. 10(A) is a diagram of the liquid crystal display device viewed from its one side. The device comprises a liquid crystal layer 93 of a nematic liquid crystal having positive dielectric anisotropy, a value $\Delta n_1 \cdot d_1$ of 0.4–1.5 μm and a twist angle of 160°–300°, a single birefringent plate 94 arranged above the liquid crystal layer and a pair of polarizing plates 91, 92 arranged at the upper and lower positions.

In this embodiment, the twist angle of the liquid crystal layer is 240°, the value $n_1 \cdot d_1$ is 0.87 μm and the crossing angle of the polarization axes of the pair of polarizing plates 91, 92 is 30°. In this embodiment, only one birefringent plate of the present invention is arranged on the liquid crystal cell for simplifying description. However, two or more birefringent plates may be used so that the directions of three main refractive indices $n_x$, $n_y$ and $n_z$ coincide.

Figure 10B:
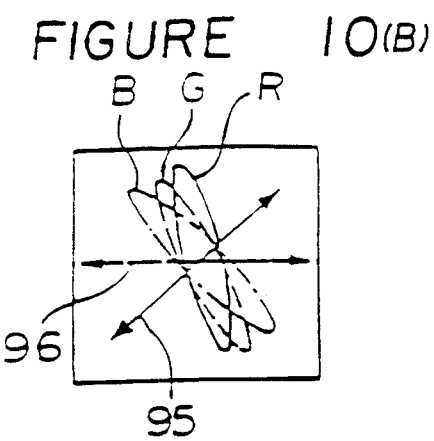

The birefringent plate, when it is interposed between polarizing plates, transforms a linearly polarized light entering thereto into an elliptically polarized light or circularly polarized light or returns the polarized light to a linearly polarized light, when viewed from the normal direction, owing to the value $\Delta n_2 \cdot d_2$ of the birefringent plate. Accordingly, a state as shown in FIG. 10(B) can be obtained by overlaying the birefringent plate having an appropriate value $\Delta n_2 \cdot d_2$ on the liquid crystal layer.

Namely, when no voltage is applied to the liquid crystal layer or a low voltage such as a non-selective voltage is applied to the liquid crystal layer, light which has been completely linearly polarized through the lower polarizing plate 92 at the side of incidence becomes an elliptically polarized state after passed through the liquid crystal layer 93. When the elliptically polarized light passes the birefringent plate 94, the elliptically polarized light can be returned to a state close to a linearly polarized light again depending on conditions. When light is divided into the three primary colors of red, green and blue, the three kinds of polarized lights are as in FIG. 10(B). As shown in FIG. 10(B), when the directions of the polarization axes of the red, green and blue lights are substantially aligned and these lights return to substantially linearly polarized lights, the wavelength dependency of the intensity of passing light can be eliminated regardless of the directions of the polarization axes at the side of emission. Namely, non-colored light is obtainable. Thus, in this embodiment, when the polarizing plates are arranged so that the polarization axes are crossed at about 30° and the polarization at the side of emission coincides with the absorbing axis of the upper polarizing plate at the side of emission, the intensity of light transmitting the polarizing plates becomes the smallest and it appears to be black, whereby a negative display is provided. In FIG. 10(B), numerals 95, 96 designate the polarization axes of the polarizing plates 91, 92.

On the other hand, the polarization axis of the upper polarizing plate is turned by 90° so that the polarization axis is substantially in parallel to the direction of polarization at the side of emission, the intensity of transmitting light becomes larger and it appears to be white, whereby a positive display is provided.

A negative display and a positive display are selected by changing conditions such as the twist angle and the $\Delta n_1 \cdot d_1$ of the liquid crystal layer, the value $\Delta n_2 \cdot d_2$ of the birefringent plate, the angles $\theta_1$, $\theta_2$, $\theta_3$ formed between the birefringent plate and the polarizing plates.

On the other hand, when a sufficient voltage is applied to the liquid crystal layer, the shape and direction of each of the elliptically polarized lights passing through the liquid crystal layer are different from those before the application of the voltage. Accordingly, the shape and direction of the elliptically polarized light after passing through the birefringent plate change, whereby the transmittance is changed to thereby produce a display.

However, insertion of the birefringent plate does not always provide white or black under the application of a voltage even though the shape and direction of the elliptically polarized light are aligned to produce a monochrome display without the application of a voltage. Therefore, it is preferable to experimentally optimize the value $\Delta n_2 \cdot d_2$, the direction of the optical axis of the birefringent plate, the direction of the polarization axis of the polarizing plate and so on depending on parameters such as the twist angle, $\Delta n_1 \cdot d_1$ and so on of the liquid crystal layer.

In a case that the liquid crystal display device is viewed from the normal direction, an excellent monochrome display can be obtained by optimizing conditions even when a conventional uniaxis birefringent plate ($n_x > n_y = n_z$) is used as the birefringent plate. However, when such monochrome display device is viewed from an oblique direction, the display may appear to be colored or may cause the inversion of black and white. Liquid crystal molecules themselves are generally of uniaxial. They, however, arranged to have a spiral structure in the liquid crystal cell as shown in FIG. 16. Further, when a selective voltage or a non-selective voltage is applied to the liquid crystal cell to conduct multiplex driving, the liquid crystal molecules at the central area are raised, whereby they can not be considered an uniaxial medium but they are considered to be a false biaxial medium.

Further, in view of the liquid crystal molecules at the central area of the liquid crystal cell as shown in FIG. 16, when average main refractive indices in this area are regarded as $n_{LX}$, $n_{LY}$ and $n_{LZ}$ (where $n_{LX}$ is an average refractive index in the direction of projection of a liquid crystal molecule at the central area to the substrate, $n_{LY}$ is an average refractive index in the plane of the substrate and in the direction perpendicular to $n_{LX}$, $n_{LZ}$ is an average refractive index in the direction of thickness), it is estimated that the average main refractive indices are in a relation of $n_{LX} > n_{LZ} > n_{LY}$ since the liquid crystal molecules have generally a spiral structure at this area and they are raised. Accordingly, it is preferable to use a birefringent plate having a similar characteristic in order to compensate the display of the liquid crystal cell when viewed from having a relation of $n_x > n_z > n_y$ of the present an oblique direction. Thus, the birefringent plate invention is preferably used.

Figure 11A:
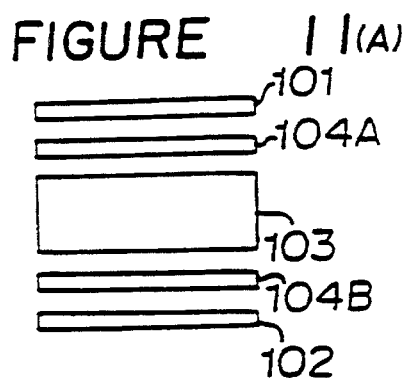

FIG. 11 shows an embodiment that a biaxial birefringent plate having a relation of $n_x > n_z > n_y$ is arranged at each side of the liquid crystal layer. FIG. 11(A) is a diagram of the liquid crystal display device of the present invention including the biaxial birefringent plates of the present invention. The display device comprises a liquid crystal layer 103 of a nematic liquid crystal having positive dielectric anisotropy, a value $\Delta n_1 \cdot d_1$ of 0.4–1.5 μm and a twist angle of 160°–300°, a pair of biaxial birefringent plates 104A, 104B arranged at both sides of the liquid crystal layer, and a pair of polarizing plates 101, 102 arranged above and below the biaxial birefringent plates 104A, 104B.

Figure 11B:
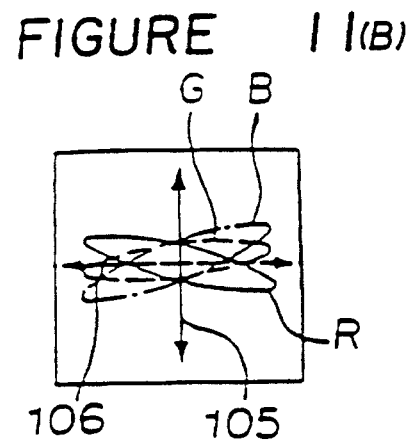

In this embodiment, the liquid crystal layer having a twist angle of 240° and a value $\Delta n_1 \cdot d_1$ of 0.82 μm and the pair of polarizing plates 101, 102 wherein the crossing angle of their polarization axes is 90° are respectively used. Although one birefringent plate is respectively arranged at each side of the liquid crystal layer in order to simplify explanation, two or more birefringent plates may be used. The birefringent plate, when it is interposed between the polarizing plates, can transform a linearly polarized light entering thereto into an elliptically polarized light or a circularly polarized light or returns the polarized light to a linearly polarized light, when viewed from the normal direction, owing to the value $\Delta n_2 \cdot d_2$ of the birefringent plate. Therefore, the shape and direction of the polarized light as shown in FIG. 11B can be obtained by overlaying the birefringent plate having an appropriate value $\Delta n_2 \cdot d_2$ on the liquid crystal layer. As described in this embodiment, when the directions of polarization axes of red, green and blue are substantially aligned and these lights are returned to substantially linearly polarized lights, wavelength dependency of the intensity of the passing lights can be eliminated regardless of the direction of the polarization axis at the side of emission. Namely, a non-colored light is obtainable.

As described in this embodiment, when the polarizing plates are arranged so that their polarization axes are crossed at an angle of 90° and the polarization at the side of emission coincides with the absorbing axis of the upper polarizing plate at the side of emission, the intensity of the transmitting light becomes the smallest and it appears to be black, whereby a negative display is provided. In FIG. 11(B), numerals 105, 106 respectively designate the polarization axes of the polarization plates 101, 102.

On the other hand, when the polarization axis of the upper polarizing plate is substantially in parallel to the polarization axis of the lower polarizing plate, the intensity of the passing light is greater and it appears to be white, whereby a positive display is provided.

The negative display or positive display is changed by changing conditions such as the twist angle and the value $\Delta n_1 \cdot d_1$ of the liquid crystal layer, the value $\Delta n_2 \cdot d_2$ of the birefringent plates and the angles $\theta_1$, $\theta_2$, $\theta_3$, $\theta_4$ of the birefringent plates to the polarizing plates.

On the other hand, when a sufficient voltage is applied to the liquid crystal layer in the above-mentioned construction, the shape and direction of the elliptically polarized light passing through the liquid crystal layer is different from those before the application of voltage. Accordingly, the conditions of the elliptically polarized light after the light has passed through the birefringent plate are different and hence, the transmittance is changed, whereby a display is provided.

In the present invention, since the biaxial birefringent plates are used, sufficient compensation is given to the display even when viewed from an oblique direction, and a wide viewing angle is obtained in a monochrome display.

Figure 12A:
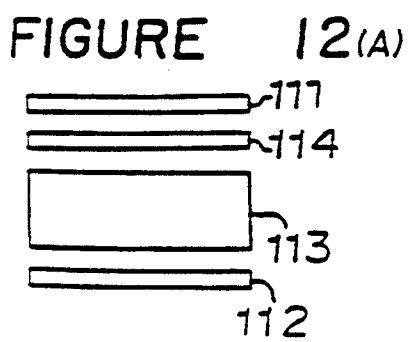

FIG. 12 shows an embodiment that a uniaxial birefringent plate having a relation of $n_x = n_z > n_y$ is arranged at one side of the liquid crystal layer. FIG. 12(A) is a diagram of the liquid crystal display device of the present invention viewed from a side. The display device comprises a liquid crystal layer 113 of a nematic liquid crystal having positive dielectric anisotropy, a twist angle of 160°–300° and a value $\Delta n_1 \cdot d_1$ of 0.4–1.5 μm, a uniaxial birefringent plate 114 having a relation of $n_x = n_z > n_y$ which is disposed at the upper part of the liquid crystal layer and a pair of polarizing plates 111, 112 arranged at the upper and lower parts.

Figure 12B:
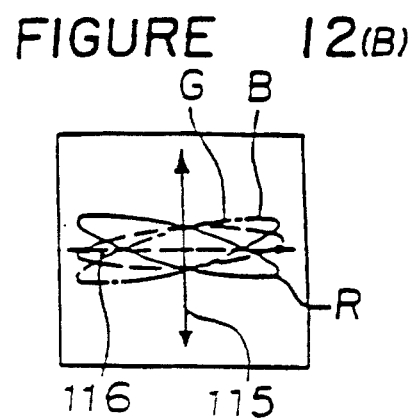

In this embodiment, the liquid crystal layer having a twist angle of 240° and $\Delta n_1 \cdot d_1$ of 0.87 μm and the pair of polarizing plates 111, 112 wherein a crossing angle of the polarizing axes is 30° are used. In this embodiment, description is made as to use of only one uniaxial birefringent plate arranged on the upper surface of the liquid crystal cell in order to simplify explanation. However, two or more birefringent plates may be used. The birefringent plate, when it is interposed between the polarizing plates, can transform a linearly polarized light entering thereto into an elliptically polarized light or a circularly polarized light or it can return the polarized light to a linearly polarized light, when viewed from the normal direction, owing to the value $\Delta n_2 \cdot d_2$ of the birefringent plate. Therefore, their shape and direction of the polarized light as shown in FIG. 12(B) can be obtained by overlaying the birefringent plate having an appropriate value $\Delta n_2 \cdot d_2$ on the liquid crystal layer.

As described in the above-mentioned embodiment, when the polarizing plates are arranged so that their polarizing axes are crossed at 90° and the polarized light at the side of emission coincides with the absorbing axis of the upper polarizing plate at the side of emission, the intensity of the passing light is the smallest and it appears to be black, whereby a negative display is provided. In FIG. 12(B), numerals 115, 116 designate the polarizing axes of the polarizing plates 111, 112.

On the contrary, when the polarization axis of the upper polarizing plate is turned by about 90°, the intensity of the light becomes larger and it appears to be white, whereby a positive display is provided.

The negative and positive displays are changeable by changing conditions such as the twist angle and the value $\Delta n_1 \cdot d_1$ of the liquid crystal layer, the value $\Delta n_2 \cdot d_2$ of the birefringent plate and the angles $\theta_1$, $\theta_2$, $\theta_3$ formed between the birefringent plate and the polarizing plates.

On the other hand, when a sufficient voltage is applied to the liquid crystal layer, the shape and direction of the elliptically polarized light passing through the liquid crystal layer are different from those before the application of voltage. Therefore, the conditions of the elliptically polarized light passing through the birefringent plate are also different, hence the transmittance is changed, whereby a display is provided.

However, insertion of the birefringent plate does not always produce a monochrome state under the application of voltage even though the shape and direction of the elliptically polarized lights are aligned to produce a monochrome state without applying the voltage. It is therefore preferable to experimentally optimize $\Delta n_2 \cdot d_2$ and the direction of the optical axis of the birefringent plate and the direction of the polarization axes of the polarizing plates and so on depending on parameters such as the twist angle and $\Delta n_1 \cdot d_1$ of the liquid crystal layer.

The uniaxial birefringent plate having a relation of $n_x = n_z > n_y$ of the present invention provides a wider viewing angle in a monochrome display than that of a conventional uniaxial birefringent plate having a relation of $n_x > n_z = n_y$.

Figure 13A:
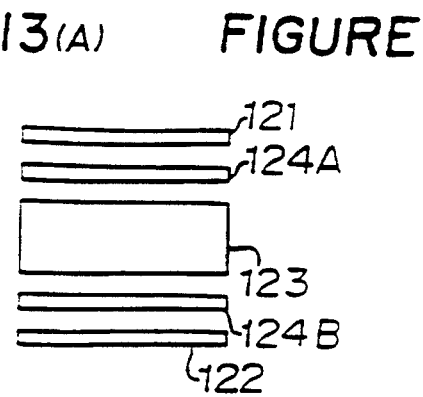

FIG. 13 shows an embodiment that a uniaxial birefringent plate having a relation of $n_x = n_z > n_y$ is arranged at each side of the liquid crystal layer. FIG. 13(A) is a diagram showing the liquid crystal display device of the present invention viewed from a side. The display device comprises a liquid crystal layer 123 of a nematic liquid crystal having positive dielectric anisotropy, a twist angle of 160°–300° and a value $\Delta n_1 \cdot d_1$ of 0.4–1.5 μm, uniaxial birefringent plates 124A, 124B each having a relation of $n_x = n_z > n_y$ arranged at both sides of the liquid crystal layer and a of polarizing plates 121, 122 arranged at outer sides of the uniaxial birefringent plates.

In this embodiment, the liquid crystal layer having the twist angle of 240° and the value $\Delta n_1 \cdot d_1$ of 0.82 μm and the pair of polarizing plates 121, 122 arranged above and below the birefringent plates so that the crossing angle of the polarization axes of the polarizing plates is 90° are used.

Description is made as to use of a pair of uniaxial birefringent plates of the present invention which are arranged at both sides of the liquid crystal layer in order to simplify description. However, two or more uniaxial birefringent plates may be used.

Figure 13B:
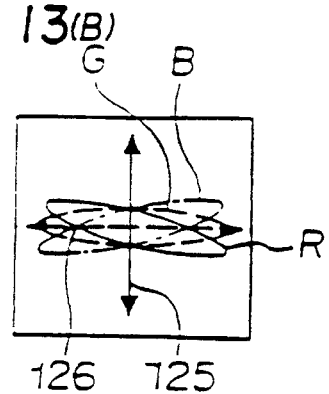

Each of the birefringent plates, when it is interposed between the polarizing plates, can transform a linearly polarized light entering thereto into an elliptically polarized light or a circularly polarized light or return the polarized light to a linearly polarized light, when viewed from the normal direction, owing to the value $\Delta n_2 \cdot d_2$ of the birefringent plate. Therefore, it is possible to obtain a state as shown in FIG. 13(B) by overlaying the birefringent plate having an appropriate value $\Delta n_2 \cdot d_2$ on the liquid crystal layer.

As described in the present invention, the wavelength dependency of the intensity of the passing light can be eliminated regardless of the direction of the polarization axes at the side of emission when the directions of the polarization axes of red, green and blue lights are substantially aligned and the polarized lights are returned to substantially linearly polarized lights. Namely, it is possible to obtain a non-colored display.

As described in this embodiment, when the polarizing plates are arranged so that their polarization axes are closed at 90° and the polarized light at the side of emission is in alignment with the absorbing axis of the upper polarizing plate at the side of emission, the intensity of light passing therethrough is the smallest and it appears to be black, whereby a negative display is provided. In FIG. 13(B), numerals 125, 126 designate the polarization axes of the polarizing plates 121, 122.

On the contrary, when the polarization axis of the upper polarizing plate is substantially in parallel to the polarization axis of the lower polarizing plate, the intensity of light passing therethrough is larger and it appears to be white, whereby a positive display is provided.

The negative display and positive display are changeable by changing conditions such as the twist angle and the value $\Delta n_1 \cdot d_1$ of the liquid crystal layer and the value $\Delta n_2 \cdot d_2$ of the birefringent plates and the angles $\theta_1$, $\theta_2$, $\theta_3$, $\theta_4$ formed between the birefringent plates and the polarizing plates.

On the other hand, when a sufficient voltage is applied to the liquid crystal layer in the above-mentioned structure, the shape and direction of the elliptically polarized light passing through the liquid crystal layer are different from those before the application of voltage. Therefore, the conditions of the elliptically polarized light after passed through the birefringent plate are different, and the transmittance is changed, whereby a display is possible.

However, insertion of the birefringent plates does not always provide a white or black state under the application of voltage even though the shape and direction of the elliptically polarized lights are aligned under the condition that no voltage is applied, so that a black and white condition is obtained. Accordingly, it is preferable to experimentally optimize the value $\Delta n_2 \cdot d_2$ of the birefringent plate, the direction of the polarization axis of the polarizing plate and so on depending on parameters such as the twist angle, the value $\Delta n_1 \cdot d_1$ of the liquid crystal layer or the like.

Use of the uniaxial birefringent plate having a relation of $n_x = n_z > n_y$ of the present invention provides a wider viewing angle in a monochrome display than use of a conventional birefringent plate having a relation of $n_x > n_z = n_y$ although the reason is not clear.

Figure 14A:
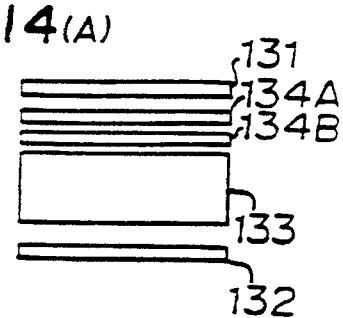

FIG. 14 shows an embodiment that a laminated body of a uniaxial birefringent plate ($n_x > n_y = n_z$) having the optical axis in its film plane and a uniaxial birefringent plate ($n_z > n_x = n_y$) having the optical axis in the direction of film thickness is arranged at one side of the liquid crystal layer. FIG. 14(A) is a diagram of the liquid crystal display device of the present invention viewed from a side. The liquid crystal display device comprises a liquid crystal layer 133 of a nematic liquid crystal having positive dielectric anisotropy, a twist angle of 160°–300° and a value $\Delta n_1 \cdot d_1$ of 0.4–1.5 µm, a uniaxial birefringent plate 134A having the optical axis in its film plane which is arranged at the upper part of the liquid crystal layer, a uniaxial birefringent plate 134B having the optical axis in the direction of film thickness and polarizing plates 131, 132 arranged at vertically outer portions.

In this embodiment, the liquid crystal layer having the twist angle of 240° and the value $\Delta n_1 \cdot d_1$ of 0.87 µm and the pair of polarizing plates 131, 132 arranged in the vertical positions so that the angle of crossing of their polarization axes is 30° are used. In this embodiment, description is made as to use of two kinds of birefringent plates which are arranged in a laminated form on the upper surface of the liquid crystal cell in order to simplify description. However, two or more birefringent plates may be used in a laminated form so that the directions of three main refractive indices are respectively aligned.

Figure 14B:
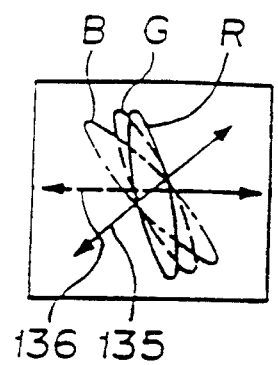

The laminated birefringent plates, when they are interposed between the polarizing plates, can transform a linearly polarized light entering thereto into an elliptically polarized light or a circularly polarized light or return the polarized light to a linearly polarized light, when viewed from the normal direction, owing to the value $\Delta n_2 \cdot d_2$ of the birefringent plates. Accordingly, it is obtainable a state as shown in FIG. 14(B) by overlaying the birefringent plates having appropriate values $\Delta n_2 \cdot d_2$ on the liquid crystal layer.

As described in this embodiment, the wavelength dependency of the intensity of the light passing through the display device can be eliminated regardless of the direction of the polarization axis at the side of emission when the directions of the polarization axes of the red, green and blue lights are substantially aligned and the polarized lights are returned to substantially linearly polarized lights. Namely, it is possible to obtain a non-colored display.

As described in this embodiment, when the polarizing plates are arranged with their polarization axes crossed at about 30° and the polarization at the side of emission is in alignment with the absorbing axis of the upper polarizing plate at the side of emission, the intensity of the passing light is the smallest and it appears to be black, whereby a negative display is provided. In FIG. 14(B), numerals 135, 136 designate the polarization axes of the polarizing plates 131, 132.

On the contrary, when the direction of the polarization axis of the upper polarizing plate is turned 90° so that the polarization axis is substantially in parallel to the direction of polarization at the side of emission, the intensity of these lights are large and light appears to be white, whereby a positive display is provided.

The negative display and positive display are changeable by changing conditions such as the twist angle and the value $\Delta n_1 \cdot d_1$ of the liquid crystal layer, the value $\Delta n_2 \cdot d_2$ of the birefringent plates, the angles $\theta_1$, $\theta_2$, $\theta_3$, formed between the birefringent plates and the polarizing plates or the like.

On the other hand, when a sufficient voltage is applied to the liquid crystal layer in the above-mentioned construction, the shape and direction of the elliptically polarized light passing through the liquid crystal layer are different from those before the application of voltage. Accordingly, the shape and direction of the elliptically polarized light after passed through the birefringent plates are also different and the transmittance is changed, whereby a display is possible.

In the present invention, since a combination of two kinds of uniaxial birefringent plates is used, a sufficient compensation is obtainable even in a case that the display device is viewed from an oblique direction and a wide viewing angle in a monochrome tone is obtainable. Namely, there is no influence to light propagating in the normal direction since a uniaxial birefringent plate having the optical axis in the direction of film thickness is used as the birefringent plate 134B as described before. On the other hand, there appears birefringence to light propagating in an oblique direction to the liquid crystal cell. Accordingly, the biaxial characteristic of the liquid crystal layer can be compensated by suitably matching the birefringent plate having the optical axis in the direction of film thickness with the birefringent plate 134A having the optical axis in the direction of film plane so as to give a relation of $n_x > n_z > n_y$.

Figure 15A:
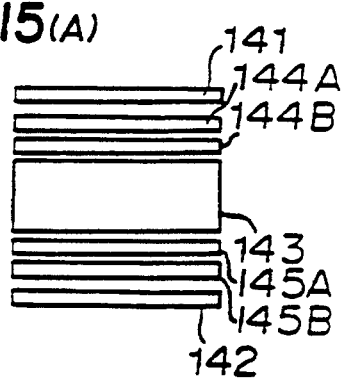

FIG. 15 shows an embodiment wherein a laminated body of a uniaxial birefringent plate ($n_x > n_y = n_z$) having the optical axis in the film plane and a uniaxial birefringent plate ($n_z > n_x = n_y$) having the optical axis in the direction of film thickness is arranged at each side of the liquid crystal layer. FIG. 15A is a diagram of the liquid crystal display device of the present invention viewed from a side. The liquid crystal display device comprises a liquid crystal layer 143 of a nematic liquid crystal having positive dielectric anisotropy, a twist angle of 160°–300° and a value $\Delta n_1 \cdot d_1$ of 0.4–1.5 µm, a uniaxial birefringent plate 144A having the optical axis in its film plane and a uniaxial birefringent plate 144B having the optical axis in the direction of film thickness disposed at the upper side of the liquid crystal layer and, a uniaxial birefringent plate 145A having the optical axis in its film plane and a uniaxial birefringent plate 145B having the optical axis in the direction of film thickness disposed at the lower side of the liquid crystal layer 143, and polarizing plates 141, 142 arranged vertically outer portions.

In this embodiment, the liquid crystal layer having a twist angle of 240°, a value $\Delta n_1 \cdot d_1$ of 0.80 µm and the pair of polarizing plates arranged at vertically outer portions so that an angle of intersection between the polarization axes of the polarizing plates is 90° are used.

In this embodiment, description is made as to use of each set of the two kinds of the birefringent plates arranged at both sides of the liquid crystal cell (four birefringent plates in total) in order to simplify description. However, three or more birefringent plates may be used at each side of the liquid crystal cell so that two or more birefringent plates are laminated with the directions of three main refractive indices of the birefringent plates being in agreement with each other. Or a single birefringent plate may be used at only single side (two or more birefringent plate are used at another side).

Figure 15B:
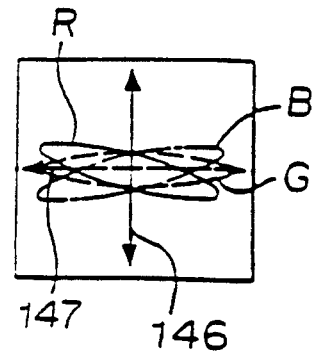

The laminated birefringent plates, when they are interposed between the polarizing plates, can transform a linearly polarized light entering thereto into an elliptically polarized light or a circularly polarized light or return the polarized light to a linearly polarized light, when viewed from the normal direction, owing to the value $\Delta n_2 \cdot d_2$ of the birefringent plate. Accordingly, there is obtainable a state as shown in FIG. 15(B) by overlaying the birefringent plates having an appropriate $\Delta n_2 \cdot d_2$ on the liquid crystal layer.

As described in this embodiment, the wavelength dependency of the intensity of light passing the birefringent plates can be eliminated regardless of the direction of the polarization axis at the side of emission when the directions of the polarization axes of red, green and blue lights are substantially in alignment and the polarized lights are returned to substantially linearly polarized lights, whereby a non-colored display is obtainable.

As in this embodiment, when the polarizing plates are arranged with their polarization axes crossing at about 90° and the polarization at the side of emission is in alignment with the absorbing axis of the upper polarizing plate at the side of emission, the intensity of the transmitting lights is the smallest and they appear to be black, whereby a negative display is provided. In FIG. 15(B), numerals 146, 147 designate the polarization axes of the polarizing plates 141, 142.

On the contrary, when the direction of the polarization axis of the upper polarizing plate is turned 90° so that it is substantially in parallel to the direction of the polarization at the side of emission, the intensity of the lights are large and they appear to be white, whereby a positive display is provided.

The negative display and positive display are changeable by changing conditions such as the twist angle and the value $\Delta n_1 \cdot d_1$ of the liquid crystal layer, the value $\Delta n_2 \cdot d_2$ of the birefringent plates, the angles $\theta_1$, $\theta_2$, $\theta_3$, $\theta_4$ formed between the birefringent plates and the polarizing plates.

On the other hand, when a sufficient voltage is applied to the liquid crystal layer in the above-mentioned construction, the shape and direction of the elliptically polarized light passing through the liquid crystal layer are different from those before the application of voltage.

Accordingly, the shape and direction of the elliptically polarized light after passed through the birefringent plate are also changed and the transmittance is changed, whereby a display becomes possible.

In the present invention, since a combination of the two kinds of uniaxial birefringent plates is used, a sufficient compensation is obtained even when the display device is viewed from an oblique direction and there is obtainable a wide viewing angle in monochrome tone. Namely, there is no influence to light propagating in the normal direction because uniaxial birefringent plates each having the optical axis in the direction of film thickness are used as the birefringent plates 144B, 145B as described before. However, there produces birefringence to light propagating obliquely to the liquid crystal cell. Therefore, the biaxial characteristic of the liquid crystal layer can be compensated by suitably matching the uniaxial birefringent plates having the optical axis in the direction of film thickness with the birefringent plates 144A, 145A having the optical axis in the direction of film plane so as to obtain a relation of $n_x > n_z > n_y$.

EXAMPLES 1 TO 3 AND COMPARATIVE EXAMPLES 1 TO 3

ITO transparent electrodes were formed on a glass substrate to have a form of stripes by patterning. Then, an insulating layer of $SiO_2$ for preventing a short circuit was formed by a vapor deposition method. An overcoating layer of polyimide was formed by a spin-coating method followed by rubbing it to form an aligning layer, whereby a first substrate was produced.

ITO transparent electrodes were formed on a glass substrate to have a form of stripes by patterning so that the direction of the transparent electrodes was perpendicular to the stripe-formed transparent electrodes of the first substrate.

An insulating layer of SiO$_2$ was formed on the transparent electrodes. An overcoating layer of polyimide was formed on the insulating layer. Then, the glass substrate with the overcoating layer was rubbed in the direction to form a crossing angle of 60° to the rubbing direction of the first substrate to thereby form an aligning layer, whereby a second substrate was prepared.

The circumferential portions of the two substrates were sealed by a sealing material to form a liquid crystal cell. A nematic liquid crystal having positive dielectric anisotropy was filled in the liquid crystal cell so that a liquid crystal layer having a twist angle of 240° was formed. Then, the injection port was sealed. The value $\Delta n_1 \cdot d_1$ of the liquid crystal layer was 0.87 μm.

Birefringent plates each having a refractive index as shown in Table 1 (Examples 1–3 and Comparative Examples 1–3), and each of the birefringent plates was bonded between the upper surface of each liquid crystal cell and an upper polarizing plate to form samples. The viewing angle of the samples were compared.

Relative angular relations among the direction of the long axis of a liquid crystal molecule of the liquid crystal layer, the direction of the polarization axis of the polarizing plate and the direction of the main refractive index $n_x$ of the birefringent plate were $\theta_1=45°$, $\theta_2=95°$ and $\theta_3=135°$.

Each of the samples was drived with 1/200 duty and 1/15 bias and evaluation was made in view of the contrast ratio in an ON state and an OFF state.

A result is shown in FIGS. 19–24. These diagrams are called as equi-contrast curves wherein the direction of the observation of a cell is shown by means of a polar coordinate. The polar coordinate is expressed by two kinds of angles (θ, Ψ) wherein θ has a scale of 0°–50° and Ψ has a scale of 0°–360°. Then, a change of the contrast ratio of a liquid crystal cell is expressed by changes of θ and Ψ. Ψ is so determined that the direction of the main viewing angle in the drawing (the lower side) is 0° and is divided into 0°–360° in the counter clockwise direction. For θ, the center of the polar coordinate is determined to be 0° and the scale of θ is divided into 0°–50° in the radial direction. Only numerals 1, 10 and 50 are indicated in the diagrams as the contrast ratio.

Figure 23:
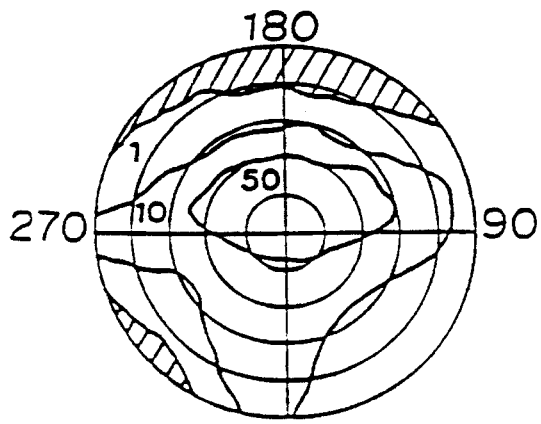

In the present invention, since the birefringent plate is used to have a relation of $n_x > n_z > n_y$ as shown in Table 1, the contrast ratio as indicated by hatching became less than 1, namely, a region in which a contrast of black and white is inversed became very small in comparison with a case that a conventional uniaxial birefringent plate was used ($n_x > n_y = n_z$, Comparative Example 2, FIG. 23). Further, a region having a high contrast ratio (a region covering 10 or higher) was broaden so that a device having a wide viewing angle and a high contrast ratio was obtained.

Figure 22:
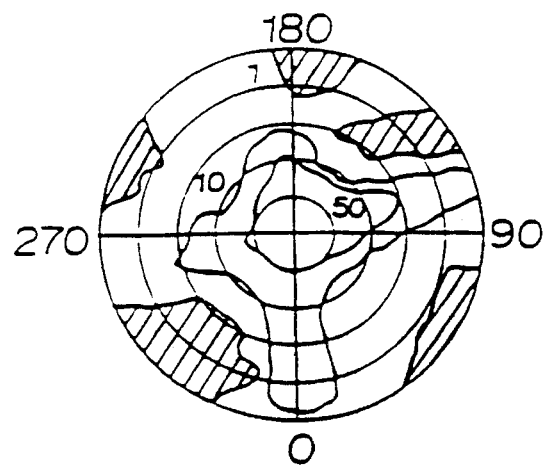
Figure 24:
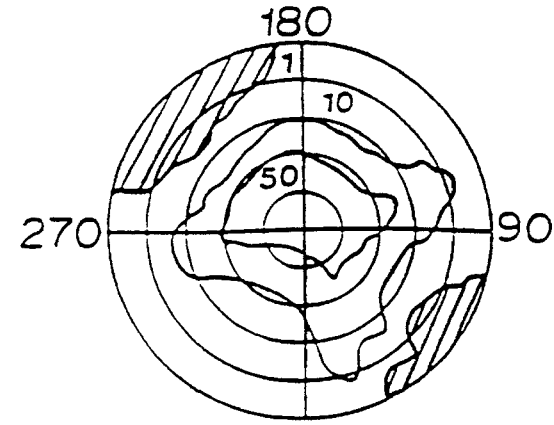

On the other hand, in a case that a biaxial birefringent plate other than that for the present invention was used, namely, in cases of Comparative Example 1 ($n_x > n_y > n_z$) and Comparative Example 3 ($n_z > n_x > n_y$), it was found that the viewing angle and a region having a high contrast ratio were narrower than those of the present invention as shown in FIGS. 22 and 24.

EXAMPLES 4 AND 5 AND COMPARATIVE EXAMPLES 4 TO 6

Each liquid crystal cell was prepared in the same manner as Example 1 except that the value $\Delta n_1 \cdot d_1$ of the liquid crystal layer was 0.82 μm.

Birefringent plates having refractive indices as shown in Table 1 (Comparative Example 4) and Table 2 (Examples 4 and 5 and Comparative Examples 5 and 6) were prepared and the birefringent plates were bonded to both surfaces of each of the liquid crystal cell to prepare samples. Then, the viewing angle of the samples were compared. Relative angular relations among the direction of the long axis of a liquid crystal molecule of the liquid crystal layer, the direction of the polarization axis of the polarizing plates and the direction of the main refractive index $n_x$ of the birefringent plates were $\theta_1=150°$, $\theta_2=80°$, $\theta_3=115°$ and $\theta_4=90°$.

The samples were drived with 1/200 duty and 1/15 bias respectively and evaluation was made in view of contrast ratios in ON and OFF states.

Figure 25:
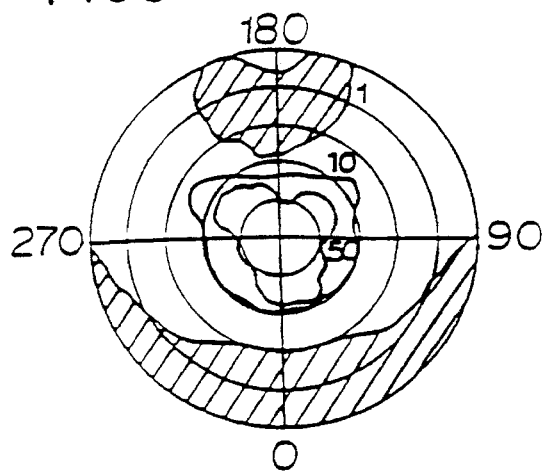
Figure 26:
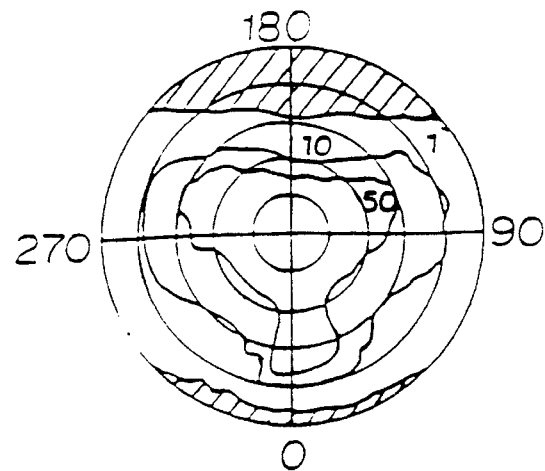
Figure 27:
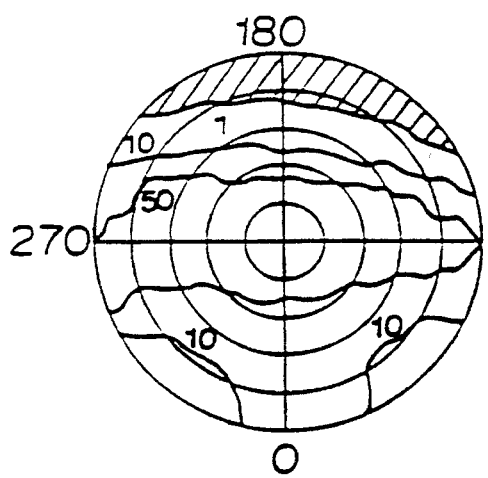
Figure 28:
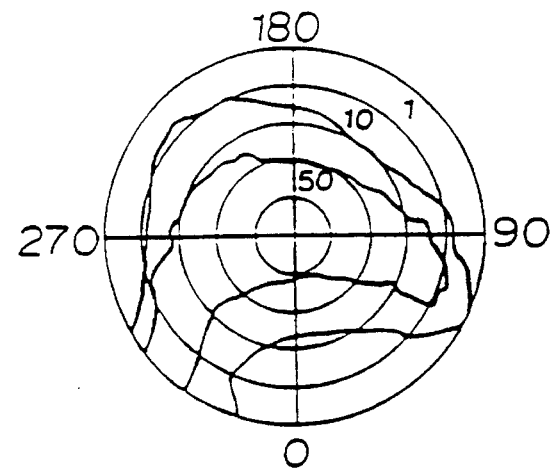
Figure 29:
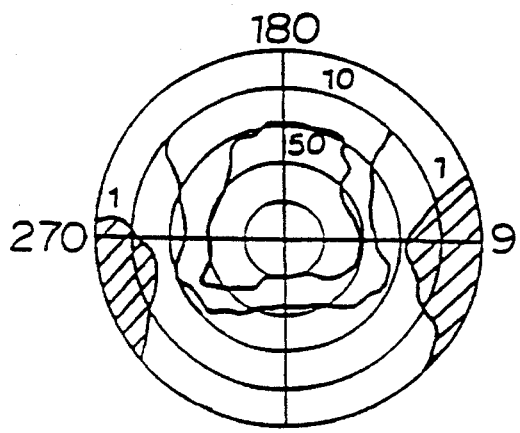

FIGS. 25 through 29 show equi-contrast curves obtained by the evaluation. FIGS. 27 and 28 show the curves of the embodiments of the liquid crystal display device of the present invention and FIGS. 25, 26 and 29 show the curves of Comparative Examples.

In the present invention, since the birefringent plates which show a relation of $n_x > n_z > n_y$ as shown in Table 1 and Table 2 are used, the contrast ratio indicated by hatching is less than 1, namely, a region in which a contrast of black and white is inversed became very small in comparison with cases that conventional uniaxial birefringent plates were used ($n_x > n_y = n_z$, Comparative Example 5, FIG. 26). Further, a region having a high contrast ratio-(a region covering 10 or more) was broaden and a device having a wide viewing angle and a high contrast ratio could be obtained.

On the other hand, in a case that uniaxial birefringent plates other than those for the present invention were used, namely, in cases of Comparative Example 4 ($n_x > n_y > n_z$) and Comparative Example 6 ($n_z > n_x > n_y$), it was found that the viewing angle and the region having a high contrast ratio were narrower than those of the present invention as shown in FIGS. 25 and 29.

EXAMPLES 6 TO 10 AND COMPARATIVE EXAMPLE 7

Uniaxial birefringent plates having refractive indices as shown in Table 2 (Examples 6 and 7) and Table 3 (Examples 8 and 9 and Comparative Example 7) were prepared and each of the birefringent plates was bonded to both surfaces of each of the liquid crystal cells prepared in accordance with Example 4 and the liquid crystal cells prepared in accordance with Example 4 provided that only $\Delta n_1 \cdot d_1$ are changed. Thus, samples were prepared (Example 6 and Comparative Example 7 and Examples 7–10). Further, a pair of polarizing plates were laminated at the upper and lower portions of each of the samples.

Relative angular relations among the direction of the long axis of a liquid crystal molecule of the liquid crystal cell, the directions of the polarization axes of the polarizing plates and the directions of optical axes of the birefringent plates were $\theta_1=150°$, $\theta_2=-5°$, $\theta_3=120°$ and $\theta_4=0°$.

With respect to the directions of the optical axes of the birefringent plates in Comparative Example 7, they are in x direction. Accordingly, the directions are different from the optical axes of the birefringent plates in Examples 6 through 10 (the optical axes direct y direction) by 90°, and accordingly $\theta_2=80°$ and $\theta_4=90°$.

A voltage was applied to the liquid crystal display device of Example 6 and a change of transmittance was examined. As a result, good threshold voltage characteristic was obtained. When multiplex driving was carried out to the display device, a good contrast ratio was obtained.

A back light of a C-light source was arranged at the back side of the liquid crystal display device so that the color phase of the liquid crystal display device in ON and OFF states when it was drived with 1/200 duty and 1/15 bias was observed. FIG. 18 shows a result.

As is clear from the result shown in FIG. 18, a negative type monochrome display wherein a good white level containing slightly yellowish green color was exhibited in an ON state and a sufficiently black tone was exhibited in an OFF state because of low transmittance, could be obtained.

The contrast ratio of the liquid crystal display device (only the picture elements) of Example 1 was about 50, which showed extremely higher contrast ratio than that of a conventional super twisted liquid crystal display device. Further, the transmittance at an ON state was about 27%. Since it was brighter than an OMI device, the display device of the present invention can be sufficiently used as a reflecting type.

The contrast ratio of the liquid crystal display devices (only picture elements) prepared in accordance with Examples 7–10 were 40 or higher.

Figure 30:
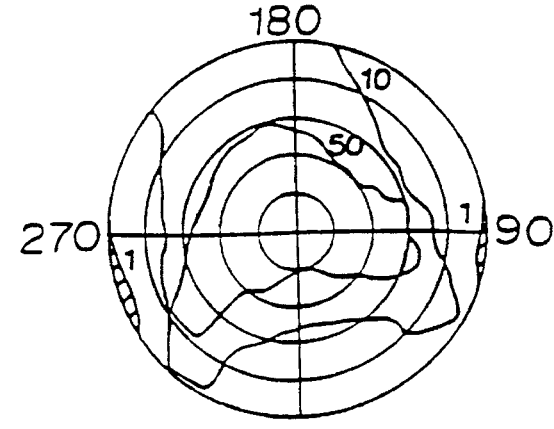
Figure 31:
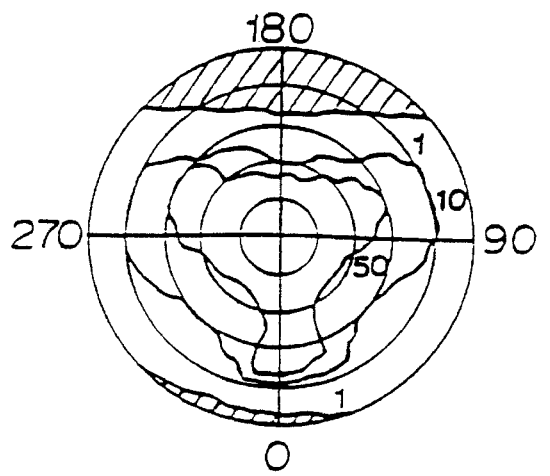

FIGS. 30 and 31 show equi-contrast curves of Example 6 and Comparative Example 7 wherein FIG. 30 shows Example 6 and FIG. 31 shows Comparative Example 7.

In the present invention, since the birefringent plates having a relation of $n_x=n_z>n_y$ were used, the contrast ratio indicated by hatching was 1 or lower, namely, a region in which a contrast of black and white is inversed became small and a device having a wide viewing angle and a high contrast ratio was obtained in comparison with a case that conventional birefringent plates were used ($n_x>n_y=n_z$, Comparative Example 7, FIG. 31) as shown in Table 2 and Table 3.

In the liquid crystal display device of Example 6, the display device was prepared by changing only relative relations among the direction of the long axis of a liquid crystal molecule, the directions of polarization axes of the polarizing plates and the directions of the optical axes of the birefringent plates. Namely, the relations were determined as $\theta_1=60°$, $\theta_2=-5°$, $\theta_3=30°$ and $\theta_4=0°$. When the liquid crystal display device was drived with 1/200 duty and 1/15 bias in the same manner as Example 6, a negative type monochrome display similar to that of Example 6 was obtained wherein the contrast ratio (only picture elements) was about 50°.

EXAMPLES 11 TO 13

Uniaxial birefringent plates having refractive indices as shown in Table 3 were prepared. Each of the uniaxial birefringent plates was bonded between an upper polarizing plate and the upper surface of the liquid crystal cell prepared in accordance with Example 1 (Example 11) and the liquid crystal cells prepared in accordance with Example 1 provided that only $\Delta n_1 \cdot d_1$ were changed (Examples 12 and 13).

In Examples 11–13, relative relations among the direction of the long axis of a liquid crystal molecule of the liquid crystal cell, the directions of the polarization the axes of the polarizing plates and the direction of the optical axis (y direction) of the birefringent plate were $\theta_1=45°$, $\theta_2=5°$ and $\theta_3=135°$.

A voltage is applied to each of the liquid crystal display devices to examine a change of transmittance. As a result, excellent threshold voltage characteristic as shown in FIG. 17 was obtained. Further, a good contrast ratio was obtained when multiplex driving was conducted to the display devices.

A back light of a C-light source was arranged at the back side of the liquid crystal display devices and the devices were drived with 1/200 duty and 1/15 bias to observe the color phase in ON and OFF states. As a result, a negative type monochrome display wherein a good white level containing slightly yellowish green color was exhibited in an ON state and sufficiently black tone was exhibited in an OFF state because of a low transmittance, could be obtained.

The contrast ratio of the liquid crystal display device (only picture elements) of Example 11 was about 50, which showed an extremely high contrast ratio in comparison with a conventional super twisted liquid crystal display device. Further, the transmittance at an ON state was about 27%. Since the display device of the present invention is brighter than an OMI device, it can sufficiently be used as a reflecting type display device.

The contrast ratio of the liquid crystal display devices (only picture elements) of Examples 12 and 13 were respectively 40 or higher.

Figure 32:
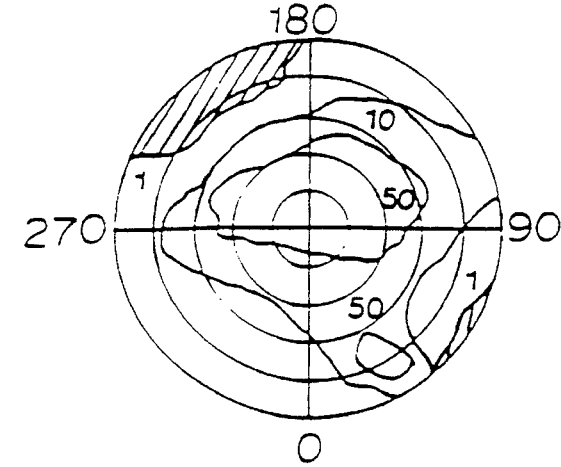
Figure 33:
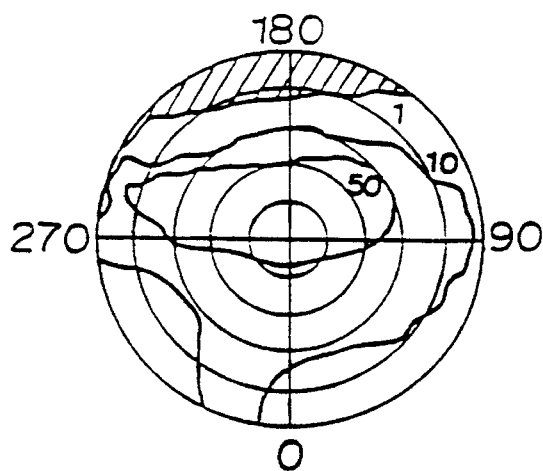
Figure 34:
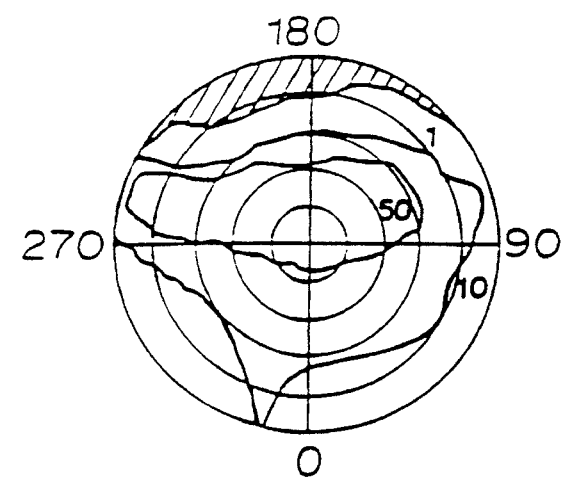
Figure 35:
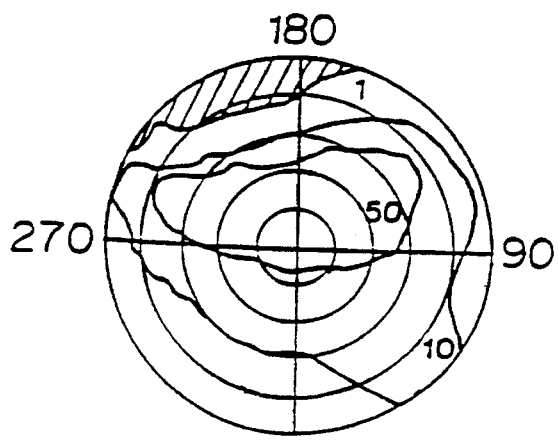
Figure 36:
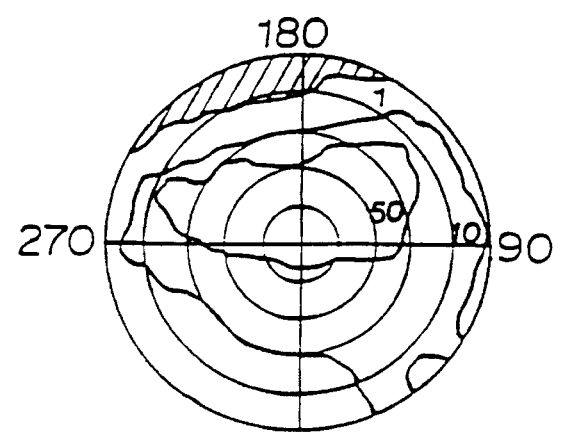
Figure 37:
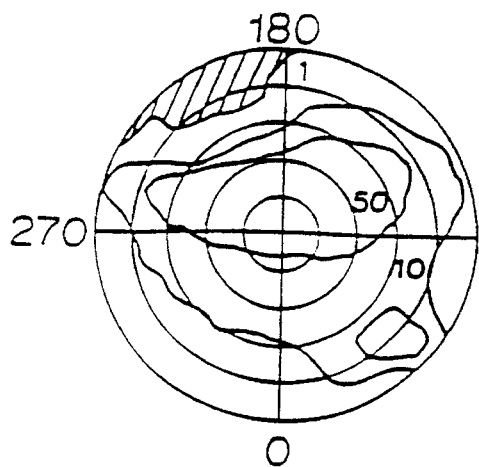
Figure 38:
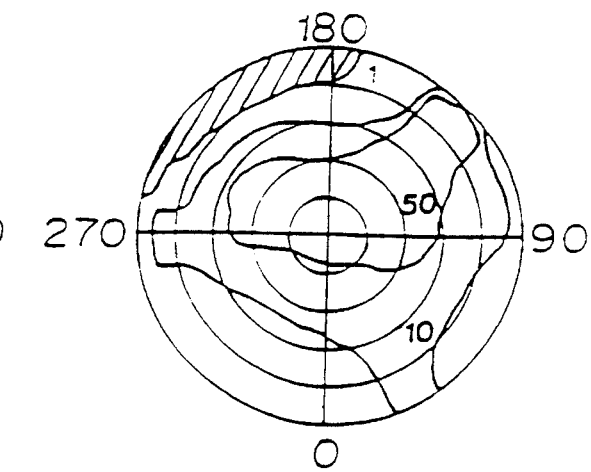

An equi-contrast curve for Example 11 is shown in FIG. 32.

In the present invention, since the birefringent plates having a relation of $n_x=n_z>n_y$ were used, the contrast ratio indicated by hatching was 1 or lower, namely, a region in which a contrast of black and white is inversed became small and a device having a wide viewing angle and a high contrast ratio was obtained in comparison with a case that conventional uniaxial birefringent plates were used ($n_x>n_y=n_z$, Comparative Example 2, FIG. 23) as shown in Table 3.

In the liquid crystal display device of Example 11, a display device was prepared by changing only relative relations among the direction of the long axis of a liquid crystal molecule, the directions of the polarization axes of the polarizing plates and the directions of the optical axes of the birefringent plates. Namely, the angular relations or $\theta_1=135°$, $\theta_2=5°$ and $\theta_3=135°$. When the liquid crystal display device was drived with 1/200 duty and 1/15 bias in the same manner as Example 1, a positive type monochrome display was obtained. The contrast ratio (only picture elements) was about 40.

EXAMPLES 14 TO 19 AND COMPARATIVE EXAMPLES 8 AND 9

Birefringent plates having refractive indices as shown in Table 4 (Examples 14–18) and Table 5 (Example 19 and Comparative Examples 8 and 9) were prepared. Each of the birefringent plates was bonded between an upper polarizing plate and the upper surface of each of the liquid crystal cells prepared in accordance with Example 1 to prepare samples. The viewing angle of the samples were measured for comparison.

Relative angular relations among the direction of the long axis of a liquid crystal molecule of the liquid crystal cell, the directions of the polarization axes of the polarizing plates and the directions of the optical axes of the uniaxial birefringent plates having their optical axes in the film plane were $\theta_1=45°$, $\theta_2=95°$ and $\theta_3=135°$.

Evaluation was made in view of the contrast ratio in ON and OFF states by driving the liquid crystal display devices with 1/200 duty and 1/15 bias.

Figure 39:
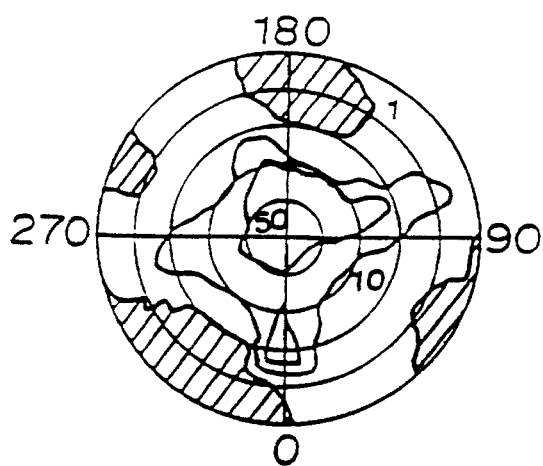
Figure 40:
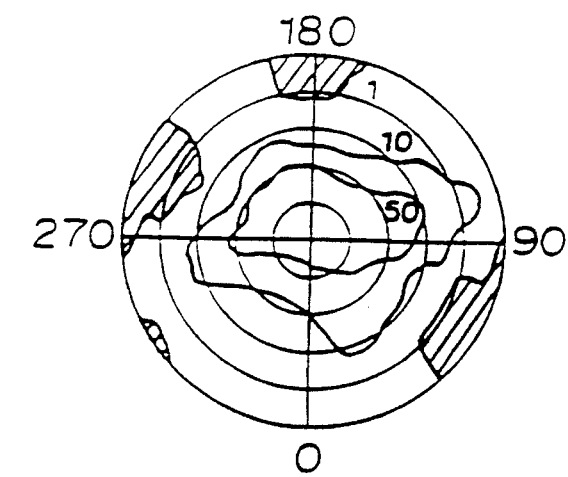
Figure 41:
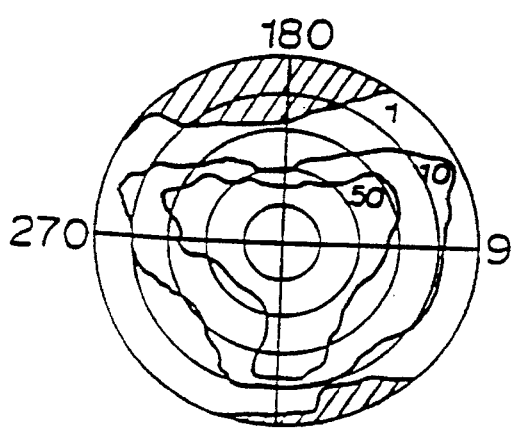
Figure 42:
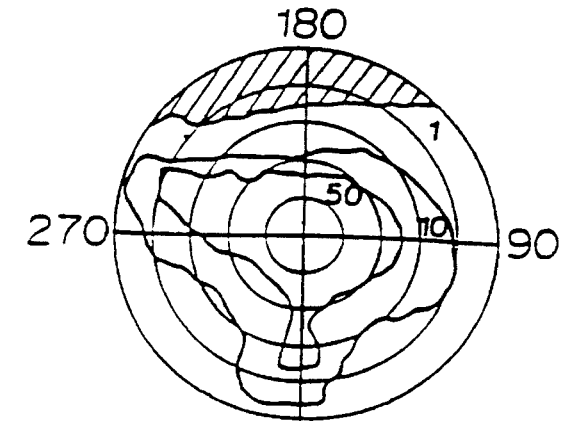
Figure 43:
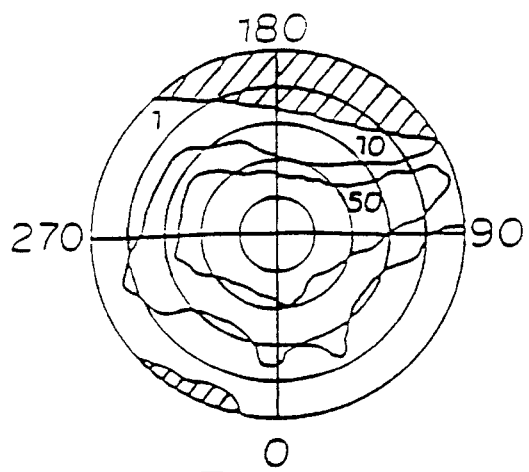
Figure 44:
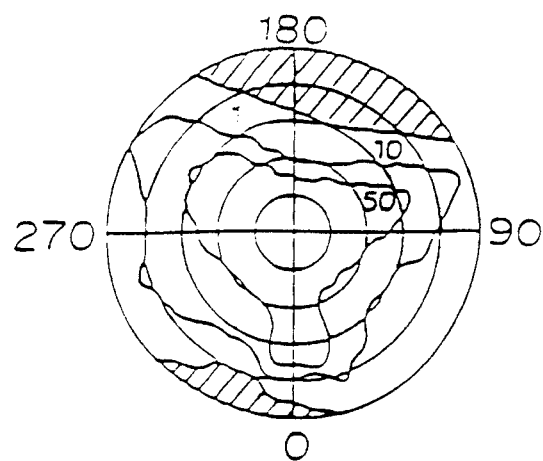
Figure 45:
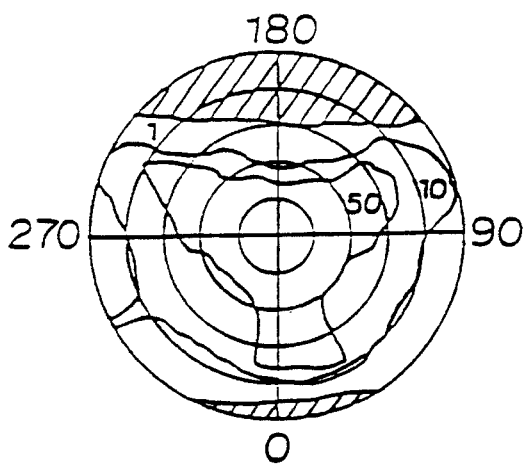
Figure 46:
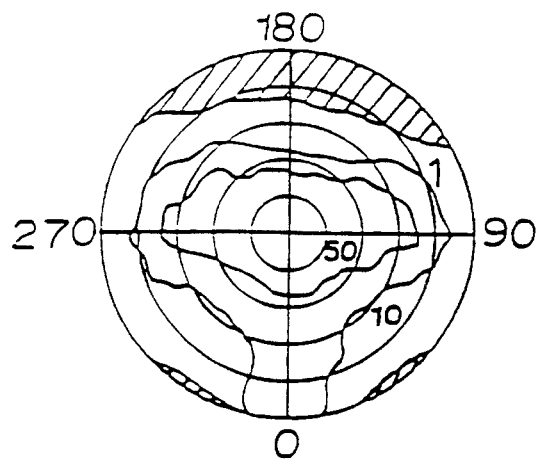
Figure 47:
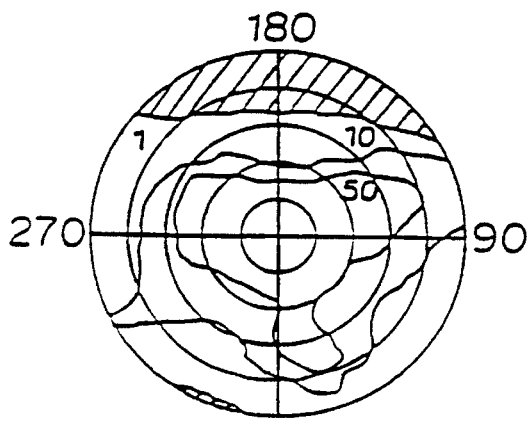
Figure 48:
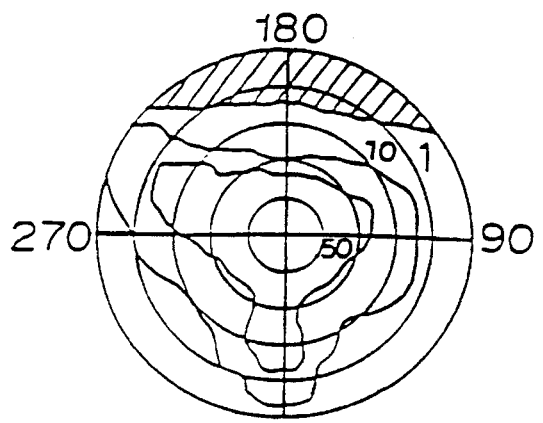
Figure 49:
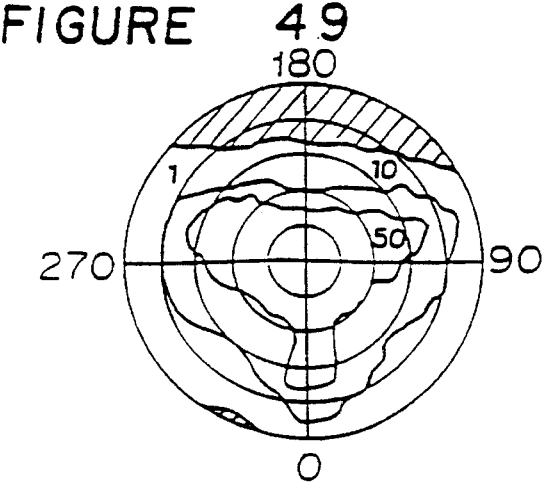
Figure 50:
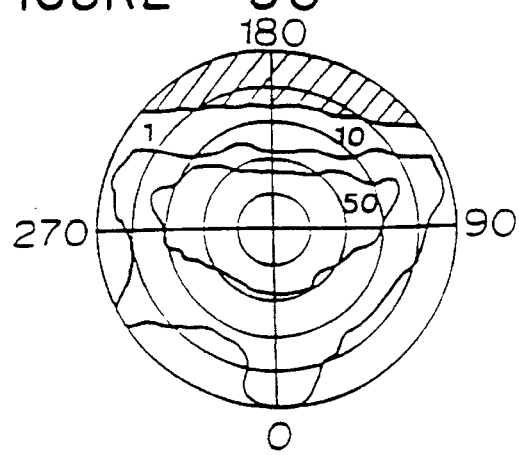
Figure 51:
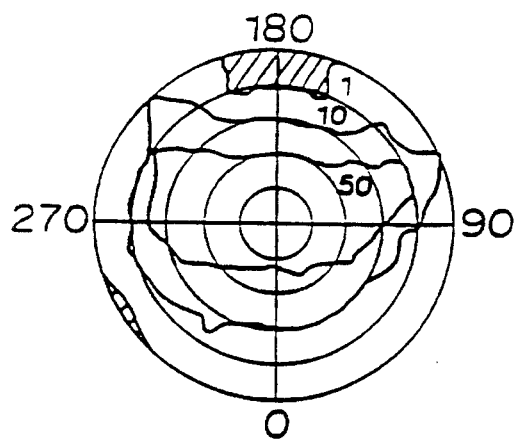

FIGS. 33 through 40 show the equi-contrast curves wherein FIGS. 33 through 38 show the embodiments of the liquid crystal display devices according to the present invention and FIGS. 39 and 40 show Comparative Examples.

In the present invention, since the birefringent plates having a relation of $n_x>n_z>n_y$ were used, the contrast ratio indicated by hatching was 1 or lower, namely, a region in which a contrast of black and white is inversed became very small in comparison with a single of conventional uniaxial birefringent plate was used ($n_x>n_y=n_z$, Comparative Example 2, FIG. 23) as shown in Table 4 and Table 5. Further, a region having a high contrast ratio (>10) was broadened and a device having a wide viewing angle and a high contrast ratio could be obtained.

When laminated birefringent plates other than those of the present invention were used for the liquid crystal display device, i.e. in cases of Comparative Examples 8 ($n_x>n_y>n_z$) and 9 ($n_z>n_x>n_y$), it was found that the viewing angle and the region having a high contrast ratio were respectively narrower than those of the present invention as shown in FIGS. 39 and 40.

EXAMPLES 20 TO 30 AND COMPARATIVE EXAMPLES 10 AND 11

Birefringent plates having refractive indices as shown in Table 5 (Examples 20 and 21), Table 6 (Examples 22 through 26), Table 7 (Examples 27 through 30 and Comparative Example 10) and Table 8 (Comparative Example 11) were prepared, and each of the birefringent plates are bonded between a polarizing plate and each of the liquid crystal cells prepared in accordance with Example 4 in a manner in arrangement described in the above-mentioned Examples and Comparative Examples. The viewing angle of each of the liquid crystal display devices was compared.

Relative angular relations of the direction of the long axis of a liquid crystal molecule of the liquid crystal cells, the directions of the polarization axes of the polarizing plates and the directions of the optical axes of the uniaxial birefringent plates each having the optical axis in the film plane were $\theta_1=60°$, $\theta_2=80°$, $\theta_3=25°$ and $\theta_4=90°$. Evaluation of the liquid crystal display devices was conducted in view of the contrast ratio in ON and OFF states by driving them with 1/200 duty and 1/15 bias.

Figure 52:
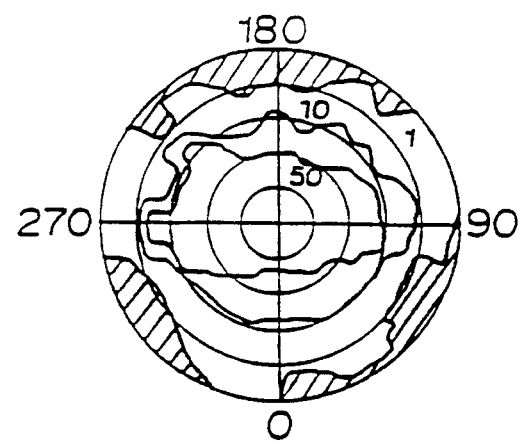
Figure 53:
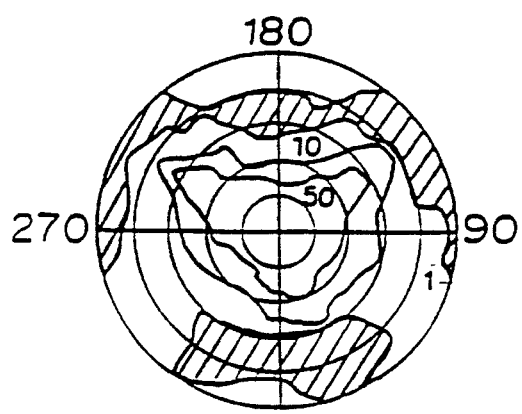

FIGS. 41 through 53 show the equi-contrast curves wherein FIGS. 41 through 51 show the embodiments of the present invention and FIGS. 52 and 53 shown Comparative Examples.

In the present invention, the birefringent plates which basically exhibit a relation of $n_x>n_z>n_y$ as shown in Examples 20–28 in Tables 5–7 are used. However, when laminated birefringent plates wherein a birefringent plate having the optical axis in its film plane is interposed between birefringent plates having the optical axes in the direction of film thickness are used and the laminated birefringent plates are arranged at each side of the liquid crystal layer, they effectively broaden the viewing angle even though there is a relation of $n_x=n_z>n_y$ as shown in Example 29 or there is a relation of $n_z>n_x>n_y$ as shown in Example 30. In such combination, birefringent plates having such characteristic that when $$N=\frac{n_z-n_y}{n_x-n_y},$$

there is obtainable $0.1\leq N\leq 3$ can be used. Accordingly, the contrast ratio indicated by hatching was 1 or lower, namely, a region in which a contrast of black and white is inversed became very small in comparison with a case that only conventional uniaxial birefringent plates were used ($n_y=n_z$, N=0, Comparative Example 5, FIG. 26). Further, the region having a high contrast ratio (>10) was broadened and a display device having a wide viewing angle and a high contrast ratio could be obtained.

On the other hand, when birefringent plates other than those used for the present invention were use, namely, in cases of using those in Comparative Examples 10(N>3) and 11 (N<0.1), it was found that the viewing angle and the region having a high contrast ratio were narrower than those of the present invention as indicated in FIGS. 52 and 53.

EXAMPLE 31

A color filter layer having three colors was formed on a substrate with electrodes of each of the liquid crystal display devices of Examples 1–30 in a form of stripes. On each of the color filter layers, each substrate with electrodes was attached to thereby constitute liquid crystal cells. when the liquid crystal cells were driven, they could show the full color tone.

As described above, in accordance with the present invention, it is possible to provide a monochrome display having a wider viewing angle and an excellent contrast ratio in comparison with conventional two layered type super twisted liquid crystal display devices or super twisted liquid crystal devices in which uniaxial birefringent plates having a relation of $n_x>n_y=n_z$ are stacked. Further, it is also obtainable a positive or a negative type display having a clear screen and high quality.

The liquid crystal display device of the present invention has the same multiplexing characteristic and viewing angle characteristic as conventional super twisted liquid crystal display devices.

The nature of a near monochrome display allows a combination with a color filter, whereby a colorful display becomes possible. In particular, it is possible to obtain a multicolor display or a full color display by arranging color filters of red, green and blue for each picture element, whereby a variety of applications are possible.

The liquid crystal display device of the present invention provides a clear display while a monochrome display is possible. Accordingly, it is applicable to a transmitting type or a reflecting type display in a wide range. Further, in the present invention, it is possible to obtain a bright monochrome display without using a second liquid crystal layer by merely arranging a birefringent plate or plates. Accordingly, productivity of the liquid crystal display devices is extremely high. In the present invention, various applications are possible as far as the effect of the present invention is not impaired.

TABLE 1

Figure 19:
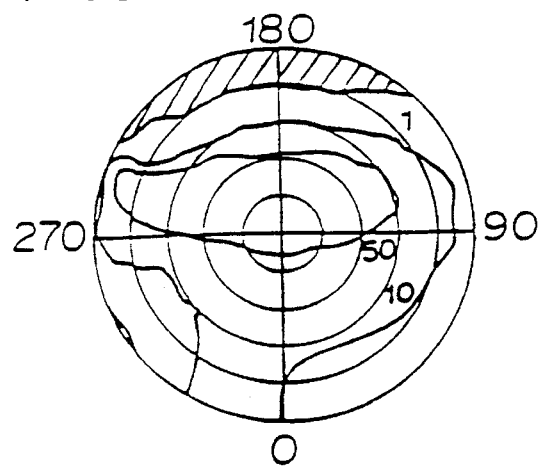
Figure 20:
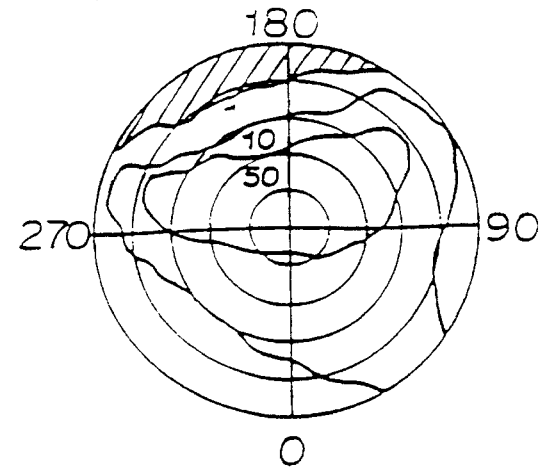
Figure 21:
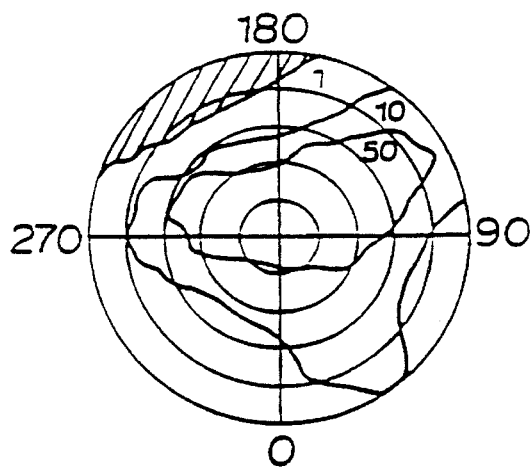

| Example | | Example 1 | Example 2 | Example 3 | Comparative Example 1 | Comparative Example 2 | Comparative Example 3 | Comparative Example 4 |
|---|---|---|---|---|---|---|---|---|
| Liquid crystal layer $\Delta n_1 \cdot d_1$ | | 0.87 μm | 0.87 μm | 0.87 μm | 0.87 μm | 0.87 μm | 0.87 μm | 0.82 μm |
| Refractive index | Characteristic | $n_x > n_z > n_y$ | $n_x > n_z > n_y$ | $n_x > n_z > n_y$ | $n_x > n_y > n_z$ | $n_x > n_y = n_z$ | $n_z > n_x > n_y$ | $n_x > n_y > n_z$ |
| | $n_x$ | 1.5876 | 1.5876 | 1.5876 | 1.5876 | 1.5876 | 1.5876 | 1.5857 |
| | $n_y$ | 1.5818 | 1.5818 | 1.5818 | 1.5818 | 1.5818 | 1.5818 | 1.5818 |
| | $n_z$ | 1.5833 | 1.5848 | 1.5863 | 1.5743 | 1.5818 | 1.5908 | 1.5743 |
| Structure | | Biaxial Single side One | Biaxial Single side One | Biaxial Single side One | Biaxial Single side One | Uniaxial Single side One | Biaxial Single side One | Biaxial Both sides Two in total |
| Birefringence $\Delta n_2 = n_x - n_y$ | | 0.0058 | 0.0058 | 0.0058 | 0.0058 | 0.0058 | 0.0058 | 0.0039 |
| Film thickness $d_2$ | | 100 μm | 100 μm | 100 μm | 100 μm | 100 μm | 100 μm | 100 μm |
| Retardation $\Delta n_2 \cdot d_2$ | | 0.58 μm | 0.58 μm | 0.58 μm | 0.58 μm | 0.58 μm | 0.58 μm | 0.39 μm |
| Contrast ratio Drawing | | FIG. 19 | FIG. 20 | FIG. 21 | FIG. 22 | FIG. 23 | FIG. 24 | FIG. 25 |

TABLE 2

| Example | | Comparative Example 5 | Example 4 | Example 5 | Comparative Example 6 | Example 6 | Example 7 | Example 8 |
|---|---|---|---|---|---|---|---|---|
| Liquid crystal layer $\Delta n_1 \cdot d_1$ | | 0.82 μm | 0.82 μm | 0.82 μm | 0.82 μm | 0.82 μm | 0.84 μm | 0.86 μm |
| Refractive index | Characteristic | $n_x > n_y = n_z$ | $n_x > n_z > n_y$ | $n_x > n_z > n_y$ | $n_z > n_x > n_y$ | $n_x = n_z > n_y$ | $n_x = n_z > n_y$ | $n_x = n_z > n_y$ |
| | $n_x$ | 1.5857 | 1.5857 | 1.5857 | 1.5857 | 1.5856 | 1.5856 | 1.5858 |
| | $n_y$ | 1.5818 | 1.5818 | 1.5818 | 1.5818 | 1.5818 | 1.5818 | 1.5818 |
| | $n_z$ | 1.5818 | 1.5833 | 1.5850 | 1.5893 | 1.5856 | 1.5856 | 1.5858 |
| Structure | | Uniaxial Both sides Two in total | Biaxial Both sides Two in total | Biaxial Both sides Two in total | Biaxial Both sides Two in total | Uniaxial Both sides Two in total | Uniaxial Both sides Two in total | Uniaxial Both sides Two in total |
| Birefringence $\Delta n_2 = n_x - n_y$ | | 0.0039 | 0.0039 | 0.0039 | 0.0039 | 0.0038 | 0.0038 | 0.0040 |
| Film thickness $d_2$ | | 100 μm | 100 μm | 100 μm | 100 μm | 100 μm | 100 μm | 100 μm |
| Retardation $\Delta n_2 \cdot d_2$ | | 0.39 μm | 0.39 μm | 0.39 μm | 0.39 μm | 0.38 μm | 0.38 μm | 0.40 μm |
| Contrast ratio Drawing | | FIG. 26 | FIG. 27 | FIG. 28 | FIG. 29 | FIG. 30 | | |

TABLE 3

| Example | | Example 9 | Example 10 | Comparative Example 7 | Example 11 | Example 12 | Example 13 |
|---|---|---|---|---|---|---|---|
| Liquid crystal layer $\Delta n_1 \cdot d_1$ | | 0.88 μm | 0.80 μm | 0.82 μm | 0.87 μm | 0.85 μm | 0.90 μm |
| Refractive index | Characteristic | $n_x = n_z > n_y$ | $n_x = n_z > n_y$ | $n_x > n_y = n_z$ | $n_x = n_z > n_y$ | $n_x = n_z > n_y$ | $n_x = n_z > n_y$ |
| | $n_x$ | 1.5858 | 1.5856 | 1.5856 | 1.5876 | 1.5876 | 1.5878 |
| | $n_y$ | 1.5818 | 1.5818 | 1.5818 | 1.5818 | 1.5818 | 1.5818 |
| | $n_z$ | 1.5858 | 1.5856 | 1.5818 | 1.5876 | 1.5876 | 1.5878 |
| Structure | | Uniaxial Both sides Two in total | Uniaxial Both sides Two in total | Uniaxial Both sides Two in total | Uniaxial Single side One | Uniaxial Single side One | Uniaxial Single side One |
| Birefringence $\Delta n_2 = n_x - n_y$ | | 0.0040 | 0.0038 | 0.0038 | 0.0058 | 0.0058 | 0.0060 |

TABLE 3-continued

| Example | Example 9 | Example 10 | Comparative Example 7 | Example 11 | Example 12 | Example 13 |
|---|---|---|---|---|---|---|
| Film thickness $d_2$ | 100 μm | 100 μm | 100 μm | 100 μm | 100 μm | 100 μm |
| Retardation $\Delta n_2 \cdot d_2$ | 0.40 μm | 0.38 μm | 0.38 μm | 0.58 μm | 0.58 μm | 0.60 μm |
| Contrast ratio Drawing | | | FIG. 31 | FIG. 32 | | |

TABLE 4

| Example | | Example 14 | Example 15 | Example 16 | Example 17 | Example 18 |
|---|---|---|---|---|---|---|
| Liquid crystal layer $\Delta n_1 \cdot d_1$ | | 0.87 μm | 0.87 μm | 0.87 μm | 0.87 μm | 0.87 μm |
| Uniaxial birefringent plate having the optical axis in the direction of film plane (F1) | $n_{x1}$ | 1.5876 | 1.5876 | 1.5876 | 1.5876 | 1.5876 |
| | $n_{y1} = n_{z1}$ | 1.5818 | 1.5818 | 1.5818 | 1.5818 | 1.5818 |
| | $d_{21}$ (μm) | 100 | 100 | 100 | 100 | 100 |
| | $\Delta n = n_{x1} - n_{y1}$ | 0.0058 | 0.0058 | 0.0058 | 0.0058 | 0.0058 |
| | Number | One | One | One | One | One |
| Uniaxial birefringent plate having the optical axis in the direction of film thickness (F2) | $n_{x2} = n_{y2}$ | 1.5818 | 1.5818 | 1.5818 | 1.5818 | 1.5818 |
| | $n_{z2}$ | 1.5833 | 1.5833 | 1.5833 | 1.5848 | 1.5848 |
| | $d_{22}$ (μm) | 100 | 100 | 100 | 100 | 100 |
| | $\Delta n = n_{z2} - n_{x2}$ | 0.0015 | 0.0015 | 0.0015 | 0.0030 | 0.0030 |
| | Number | One | One | Two | One | One |
| Arithmetical mean of refractive index taking the thickness into consideration | $n_x$ | 1.5847 | 1.5847 | 1.5837 | 1.5847 | 1.5847 |
| | $n_y$ | 1.5818 | 1.5818 | 1.5818 | 1.5818 | 1.5818 |
| | $n_z$ | 1.5826 | 1.5826 | 1.5828 | 1.5833 | 1.5833 |
| Characteristic | | $n_x > n_z > n_y$ | $n_x > n_z > n_y$ | $n_x > n_z > n_y$ | $n_x > n_z > n_y$ | $n_x > n_z > n_y$ |
| $\dfrac{n_z - n_y}{n_x - n_y}$ | | 0.28 | 0.28 | 0.53 | 0.52 | 0.52 |
| Structure | P: Polarizing plate F1: Birefringent plate F2: Birefringent plate LC: Liquid crystal layer | P F2 F1 LC P | P F1 F2 LC P | P F2 F1 F2 LC P | P F2 F1 LC P | P F1 F2 LC P |
| Contrast ratio Drawing | | FIG. 33 | FIG. 34 | FIG. 35 | FIG. 36 | FIG. 37 |

40

TABLE 5

| Example | | Example 19 | Comparative Example 8 | Comparative Example 9 | Example 20 | Example 21 |
|---|---|---|---|---|---|---|
| Liquid crystal layer $\Delta n_1 \cdot d_1$ | | 0.87 μm | 0.87 μm | 0.87 μm | 0.82 μm | 0.82 μm |
| Uniaxial birefringent plate having the optical axis in the direction of film plane (F1) | $n_{x1}$ | 1.5876 | 1.5876 | 1.5876 | 1.5857 | 1.5857 |
| | $n_{y1} = n_{z1}$ | 1.5818 | 1.5818 | 1.5818 | 1.5818 | 1.5818 |
| | $d_{21}$ (μm) | 100 | 100 | 100 | 100 | 100 |
| | $\Delta n = n_{x1} - n_{y1}$ | 0.0058 | 0.0058 | 0.0058 | 0.0039 | 0.0039 |
| | Number | One | One | One | Two | Two |
| Uniaxial birefringent plate having the optical axis in the direction of film thickness (F2) | $n_{x2} = n_{y2}$ | 1.5818 | 1.5818 | 1.5818 | 1.5818 | 1.5818 |
| | $n_{z2}$ | 1.5863 | 1.5743 | 1.5908 | 1.5833 | 1.5833 |
| | $d_{22}$ (μm) | 100 | 100 | 100 | 100 | 100 |
| | $\Delta n = n_{z2} - n_{x2}$ | 0.0045 | 0.0075 | 0.0090 | 0.0015 | 0.0015 |
| | Number | One | One | One | One | One |
| Arithmetical mean of refractive index taking the thickness into consideration | $n_x$ | 1.5847 | 1.5847 | 1.5847 | 1.5838 | 1.5838 |
| | $n_y$ | 1.5818 | 1.5818 | 1.5818 | 1.5818 | 1.5818 |
| | $n_z$ | 1.5841 | 1.5781 | 1.5863 | 1.5826 | 1.5826 |
| Characteristic | | $n_x > n_z > n_y$ | $n_x > n_z > n_y$ | $n_x > n_z > n_y$ | $n_x > n_z > n_y$ | $n_x > n_z > n_y$ |
| $\dfrac{n_z - n_y}{n_x - n_y}$ | | 0.80 | 2.17 | 1.55 | 0.40 | 0.40 |
| | P: Polarizing plate F1: Birefringent plate | P F2 | P F2 | P F2 | P F2 | P F1 |

TABLE 5-continued

| Example | | Example 19 | Comparative Example 8 | Comparative Example 9 | Example 20 | Example 21 |
|---|---|---|---|---|---|---|
| Structure | F2: Birefringent plate | F1 | F1 | F1 | F1 | F2 |
| | LC: Liquid crystal layer | LC | LC | LC | LC | LC |
| | | | | | F1 | F1 |
| | | P | P | P | P | P |
| Contrast ratio Drawing | | FIG. 38 | FIG. 39 | FIG. 40 | FIG. 41 | FIG. 42 |

TABLE 6

| Example | | | Example 22 | Example 23 | Example 24 | Example 25 | Example 26 |
|---|---|---|---|---|---|---|---|
| Liquid crystal layer $\Delta n_1 \cdot d_1$ | | | 0.82 μm | 0.82 μm | 0.82 μm | 0.82 μm | 0.82 μm |
| Uniaxial birefringent plate | | $n_{x1}$ | 1.5857 | 1.5857 | 1.5857 | 1.5857 | 1.5857 |
| having the optical axis | | $n_{y1} = n_{z1}$ | 1.5818 | 1.5818 | 1.5818 | 1.5818 | 1.5818 |
| in the direction of film | | $d_{21}$ (μm) | 100 | 100 | 100 | 100 | 100 |
| plane (F1) | | $\Delta n = n_{x1} - n_{y1}$ | 0.0039 | 0.0039 | 0.0039 | 0.0039 | 0.0039 |
| | | Number | Two | Two | Two | Two | Two |
| Uniaxial birefringent plate | | $n_{x2} = n_{y2}$ | 1.5818 | 1.5818 | 1.5818 | 1.5818 | 1.5818 |
| having the optical axis | | $n_{z2}$ | 1.5833 | 1.5833 | 1.5833 | 1.5833 | 1.5833 |
| in the direction of film | | $d_{22}$ (μM) | 100 | 100 | 100 | 100 | 100 |
| thickness (F2) | | $\Delta n = n_{x2} - n_{z2}$ | 0.0015 | 0.0015 | 0.0015 | 0.0015 | 0.0015 |
| | | Number | One | One | One | One | One |
| Arithmetical mean of refractive | | $n_x$ | 1.5838 | 1.5838 | 1.5838 | 1.5838 | 1.5838 |
| index taking the thickness | | $n_y$ | 1.5818 | 1.5818 | 1.5818 | 1.5818 | 1.5818 |
| into consideration | | $n_z$ | 1.5826 | 1.5826 | 1.5826 | 1.5826 | 1.5826 |
| Characteristic | | | $n_x > n_z > n_y$ | $n_x > n_z > n_y$ | $n_x > n_z > n_y$ | $n_x > n_z > n_y$ | $n_x > n_z > n_y$ |
| $\dfrac{n_z - n_y}{n_x - n_y}$ | | | 0.40 | 0.40 | 0.40 | 0.40 | 0.40 |
| | P: Polarizing plate | | P | P | P | P | P |
| | F1: Birefringent plate | | | | F2 | F1 | F2 |
| Structure | F2: Birefringent plate | | F1 | F1 | F1 | F2 | F1 |
| | LC: Liquid crystal layer | | LC | LC | LC | LC | LC |
| | | | F2 | F1 | F1 | F1 | F2 |
| | | | F1 | F2 | F2 | F1 | F1 |
| | | | P | P | P | P | P |
| Contrast ratio Drawing | | | FIG. 43 | FIG. 44 | FIG. 45 | FIG. 46 | FIG. 47 |

TABLE 7

| Example | | | Example 27 | Example 28 | Example 29 | Example 30 | Comparative Example 10 |
|---|---|---|---|---|---|---|---|
| Liquid crystal layer $\Delta n_1 \cdot d_1$ | | | 0.82 μm | 0.82 μm | 0.82 μm | 0.82 μm | 0.82 μm |
| Uniaxial birefringent plate | | $n_{x1}$ | 1.5857 | 1.5857 | 1.5857 | 1.5857 | 1.5857 |
| having the optical axis | | $n_{y1} = n_{z1}$ | 1.5818 | 1.5818 | 1.5818 | 1.5818 | 1.5818 |
| in the direction of film | | $d_{21}$ (μm) | 100 | 100 | 100 | 100 | 100 |
| plane (F1) | | $\Delta n = n_{x1} - n_{y1}$ | 0.0039 | 0.0039 | 0.0039 | 0.0039 | 0.0039 |
| | | Number | Two | Two | Two | Two | Two |
| Uniaxial birefringent plate | | $n_{x2} = n_{y2}$ | 1.5818 | 1.5818 | 1.5818 | 1.5818 | 1.5818 |
| having the optical axis | | $n_{z2}$ | 1.5833 | 1.5826 | 1.5838 | 1.5868 | 1.5893 |
| in the direction of film | | $d_{22}$ (μm) | 100 | 100 | 100 | 100 | 100 |
| thickness (F1) | | $\Delta n = n_{z2} - n_{x2}$ | 0.0015 | 0.0008 | 0.0020 | 0.0050 | 0.0075 |
| | | Number | Two | Four | Four | Four | Four |
| Arithmetical mean of refractive | | $n_x$ | 1.5838 | 1.5831 | 1.5831 | 1.5831 | 1.5831 |
| index taking the thickness | | $n_y$ | 1.5818 | 1.5818 | 1.5818 | 1.5818 | 1.5818 |
| into consideration | | $n_z$ | 1.5826 | 1.5823 | 1.5831 | 1.5851 | 1.5868 |
| Characteristic | | | $n_x > n_z > n_y$ | $n_x > n_z > n_y$ | $n_x > n_z > n_y$ | $n_x > n_z > n_y$ | $n_x > n_z > n_y$ |
| $\dfrac{n_z - n_y}{n_x - n_y}$ | | | 0.40 | 0.38 | 1.00 | 2.5 | 3.8 |
| | | | P | P | P | P | P |
| | | | | F2 | F2 | F2 | F2 |
| | P: Polarizing plate | | F1 | F1 | F1 | F1 | F1 |

TABLE 7-continued

| Example | | Example 27 | Example 28 | Example 29 | Example 30 | Comparative Example 10 |
|---|---|---|---|---|---|---|
| Structure | F1 Birefringent plate | F2 | F2 | F2 | F2 | F2 |
| | F2: Birefringent plate | LC | LC | LC | LC | LC |
| | LC: Liquid crystal layer | F1 | F2 | F2 | F2 | F2 |
| | | F2 | F1 | F1 | F1 | F1 |
| | | | F2 | F2 | F2 | F2 |
| | | P | P | P | P | P |
| Contrast ratio Drawing | | FIG. 48 | FIG. 49 | FIG. 50 | FIG. 51 | FIG. 52 |

TABLE 8

| Example | | | Comparative Example 11 |
|---|---|---|---|
| Liquid crystal layer $\Delta n_1 \cdot d_1$ | | | 0.82 μm |
| Uniaxial birefringent plate having the optical axis in the direction of film plane (F1) | | $n_{x1}$ | 1.5857 |
| | | $n_{y1} = n_{z1}$ | 1.5818 |
| | | $d_{21}$ (μm) | 100 |
| | | $\Delta n = n_{x1} - n_{y1}$ | 0.0039 |
| | | Number | Two |
| Uniaxial birefringent plate having the optical axis in the direction of film thickness (F1) | | $n_{x2} = n_{y2}$ | 1.5818 |
| | | $n_{z2}$ | 1.5743 |
| | | $d_{22}$ (μm) | 100 |
| | | $\Delta n = n_{z2} - n_{x2}$ | −0.0075 |
| | | Number | Four |
| Arithmetical mean of refractive index taking the thickness into consideration | | $n_x$ | 1.5831 |
| | | $n_y$ | 1.5818 |
| | | $n_z$ | 1.5768 |
| Characteristic | | | $n_x > n_y > n_z$ |
| $\dfrac{n_z - n_y}{n_x - n_y}$ | | | −3.8 |
| Structure | P: Polarizing plate | | P |
| | F1: Birefringent plate | | F2 |
| | F2: Birefringent plate | | F1 |
| | LC: Liquid crystal layer | | F2 |
| | | | LC |
| | | | F2 |
| | | | F1 |
| | | | F2 |
| | | | P |
| Contrast ratio Drawing | | | FIG. 53 |

We claim:

1. A liquid crystal display device comprising a background portion and pixel portions which comprises:

a) a liquid crystal layer of a nematic liquid crystal having positive dielectric anisotropy of refractive index $\Delta n_1$ of liquid crystal molecules in the liquid crystal layer and the thickness $d_1$ of the liquid crystal layer is in a range of 0.4–1.5 μm, b) said liquid crystal layer being interposed between a pair of substrates with transparent electrodes each having an aligning layer which are arranged substantially in parallel to provide a twist angle of 160°–300°, c) a driving means to apply a voltage across the electrodes attached to said substrates, and d) a pair of polarizing plates arranged outside the liquid crystal layer, wherein at least one birefringent plate is provided between the liquid crystal layer and the polarizing plate at at least one side of said liquid crystal layer, and three main refractive indices $n_x$, $n_y$, and $n_z$ of the birefringent plate are in relation of $n_x = n_z > n_y$, wherein $n_x$, $n_y$ respectively represent the refractive indices in the direction of film plane of the birefringent plate (provided $n_x > n_y$) and $n_z$ represents the refractive index in the direction of film thickness of the birefringent plate, and wherein a light shielding film is provided to cover the background so that a background portion except for pixel portions is in a light shielding state.

2. A liquid crystal display device according to claim 1, wherein said birefringent plate is arranged between the liquid crystal layer and the polarizing plate at one side of the liquid crystal layer.

* * * * *